United States Patent
Ou et al.

(10) Patent No.: US 10,389,618 B2
(45) Date of Patent: Aug. 20, 2019

(54) DISTRIBUTING NETWORK PATH INFORMATION IN A NETWORK ENVIRONMENT

(71) Applicant: CISCO TECHNOLOGY, INC., San Jose, CA (US)

(72) Inventors: Heidi Ou, Saratoga, CA (US); Sridhar Vallepalli, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 74 days.

(21) Appl. No.: 15/413,131

(22) Filed: Jan. 23, 2017

(65) Prior Publication Data
US 2018/0212861 A1   Jul. 26, 2018

(51) Int. Cl.
*H04L 12/751*   (2013.01)
*H04L 12/761*   (2013.01)
*H04L 12/18*    (2006.01)

(52) U.S. Cl.
CPC .......... *H04L 45/02* (2013.01); *H04L 12/1877* (2013.01); *H04L 45/16* (2013.01)

(58) Field of Classification Search
CPC ....................................................... H04L 45/24
See application file for complete search history.

(56) References Cited

U.S. PATENT DOCUMENTS

| 6,078,590 | A | 6/2000 | Farinacci et al. | |
| 7,529,199 | B1 | 5/2009 | Wijnands et al. | |
| 2004/0243670 | A1* | 12/2004 | Grimminger | H04L 45/00 709/203 |
| 2008/0075016 | A1* | 3/2008 | Ashwood-Smith | H04L 45/02 370/252 |
| 2012/0263035 | A1* | 10/2012 | Nakanishi | H04L 45/02 370/225 |
| 2017/0093695 | A1* | 3/2017 | Kebler | H04L 45/28 |

OTHER PUBLICATIONS

Asghar, J., et al., "Explicit RPF Vector," Network Working Group, Apr. 26, 2016, 9 pages; https://tools.ietf.org/pdf/draft-ietf-pim-explicit-rpf-vector-09.pdf.
"IP Multicast Technology Overview," DIG: Enterprise Campus Topology, Apr. 18, 2002, 24 pages.
Wijands, et al., "The Reverse Path Forwarding (RPF) Vector TLV," Network Working Group, Request for Comments: 5496, Standards Track, Mar. 2009, 8 pages.

* cited by examiner

*Primary Examiner* — Kevin M Cunningham

(57) ABSTRACT

Methods for distributing multicast network path information to various network nodes in a network environment are disclosed. An exemplary method includes a downstream node transmitting a first message including a network path indicating a specific desired route that is to be used when delivering multicast traffic from a given multicast source to a given host, as well as an identifier assigned to the network path in order to uniquely identify that network path in the network. The method also includes the downstream node transmitting a second message for announcing that the multicast source is to be reached via the network path announced in the first message. The second message identifies the network path to be used by including the identifier of the path announced in the first message, but not the network path itself.

17 Claims, 14 Drawing Sheets

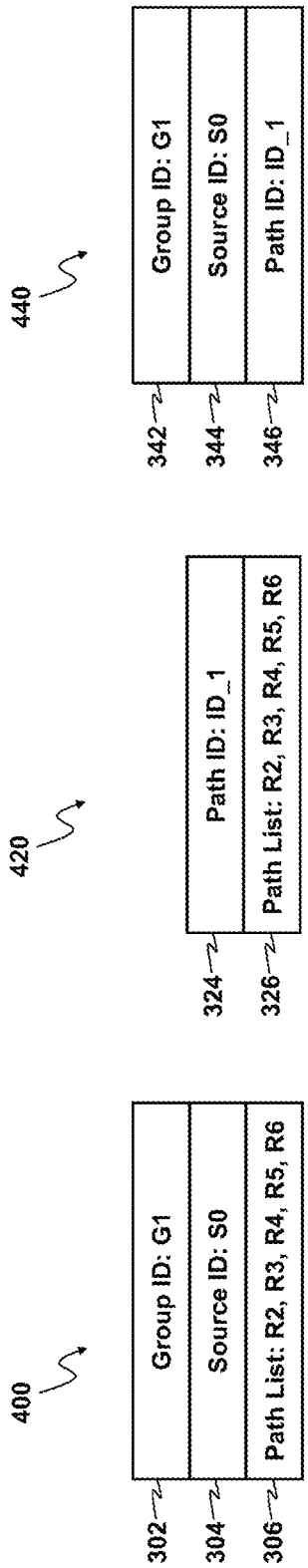

ical field, to systems and methods for
DISTRIBUTING NETWORK PATH INFORMATION IN A NETWORK ENVIRONMENT

TECHNICAL FIELD

This disclosure relates in general to the field of communications and, more particularly, to systems and methods for distributing network path information in a network environment.

BACKGROUND

Networking architectures have grown increasingly complex in communication environments. A typical network environment contains a myriad of network nodes, including hosts, load balancers, routers, switches, etc. These network nodes support propagation of data packets from sources to destination hosts. Improving operational efficiency and optimizing utilization of resources in such network environments are some of the challenges facing their managers. One such challenge arises from a fact that, often times, in a typical network environment, e.g. in a service provider network, various network nodes have varying characteristics in terms of bandwidth, latency, fault tolerance, legal requirements, etc. Because of this, it may be desirable to have control over which network paths are traversed by data packets sent by sources, a process known as a "path selection." Path selection allows selecting a sequence of specific network nodes within a network environment for forwarding traffic from a given source to one or more destination hosts in an attempt to optimize performance and resilience requirements. Efficient distribution of network path information to all network nodes involved is desired by network operators, service providers, and end users alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 4A illustrates an example of a conventional PIM join/prune message for announcing one path to one source;

FIGS. 4B and 4C illustrate, respectively, a path list message and a PIM join/prune message for announcing one path to one source, according to some embodiments of the present disclosure;

DETAILED DESCRIPTION OF EXAMPLE EMBODIMENTS

Overview

Figure 1:
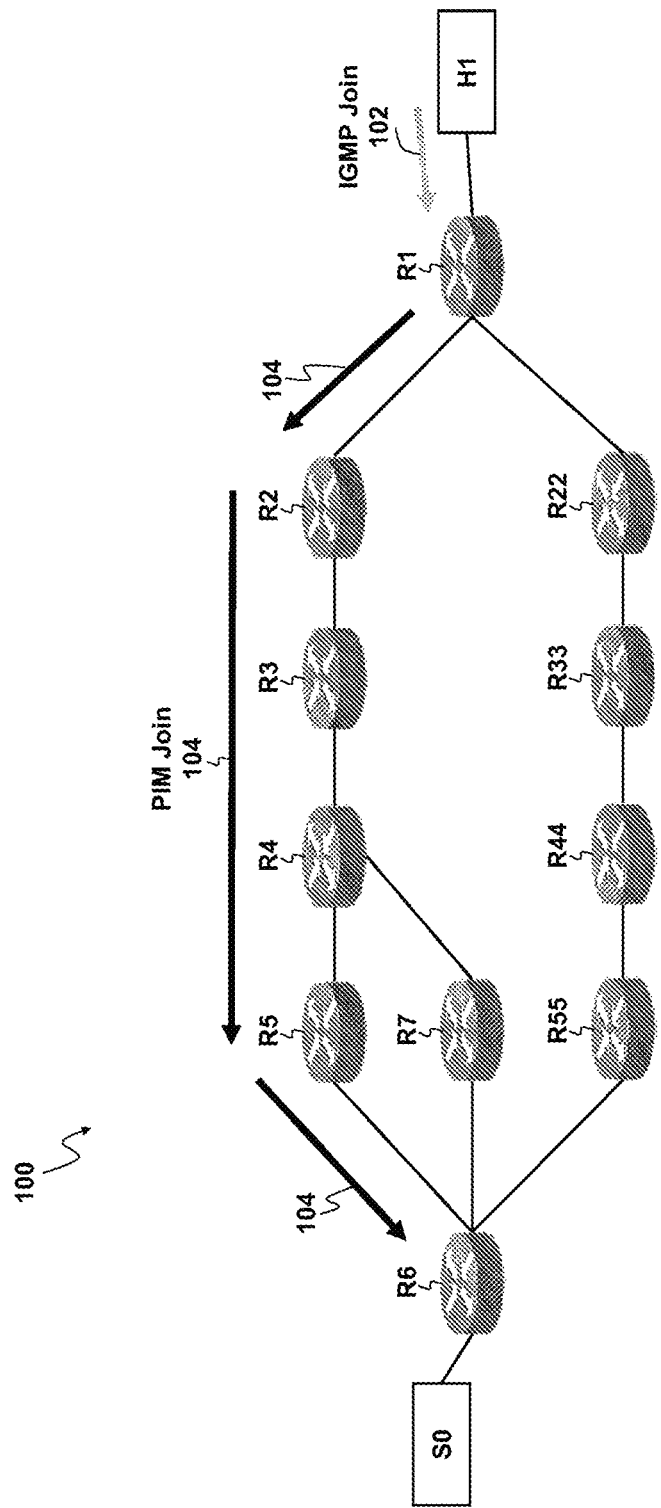
FIG. 1 is a simplified block diagram illustrating a conventional approach to distributing network path information in a network environment using PIM join/prune messages.

Embodiments of the present disclosure provide methods for distributing network path information, in particular for distributing multicast path selection information, to various network nodes in a network environment. In one aspect of the present disclosure, an exemplary method includes a downstream network node generating and transmitting a first message that includes a network path indicating a specific desired route that is to be used when delivering multicast traffic from a given multicast source to a given host. The network path specifies a sequence of one or more intermediate network nodes between a downstream node communicatively connected to the host and an upstream node communicatively connected to the multicast source which are to be traversed when forwarding multicast traffic from the source to the host. In addition, the first message includes an identifier assigned to the network path in order to uniquely identify that network path in the network. The method also includes the downstream node generating and transmitting a second message for announcing that the multicast source is to be reached via the network path announced in the first message. The second message identifies the network path to be used by including the identifier of the path announced in the first message, but not the network path itself (i.e. not the sequence of nodes).

The first message as described above is a new type of message proposed herein and is referred to in the following as a "path list message." The second message as described above can e.g. be a protocol-independent-multicast (PIM) join/prune message. Conventionally, PIM join/prune messages carried both the identification of a multicast source to which the message relates and a network path from the source to the host. One problem with such conventional implementations is that PIM join/prune messages can potentially get very large, due to the encoding of explicit paths, necessitating the use of additional PIM join/prune messages to convey the network path information. Furthermore, in case there are changes to a path, all of the PIM join/prune messages have to be re-sent, carrying the updated path information to all of the network nodes in the updated path, and each network node in the updated path will have to re-process the message. In contrast to such conventional implementations, using the identifier of a network path in such messages, instead of the network path itself, and sending the explicit network path information in a separate message, as proposed in the present disclosure, advantageously allows reducing the number of messages traversing the network.

In the following detailed description, various aspects of the illustrative implementations will be described using terms commonly employed by those skilled in the art to convey the substance of their work to others skilled in the art. For example, the term "multicast source" (sometimes interchangeably referred to as a "multicast source device" or simply as a "source") refers to any computing/storage device that functions as a source of distributing multicast content, while the term "host" (sometimes interchangeably referred to as a "destination", a "receiver," a "host device," or a "customer/client device") refers to any computing/storage device that consumes multicast content. In various embodiments, a "host" may be or may include, by way of non-limiting example, any device providing storage, network, or/and computing resource in a network environment. Examples of hosts include, but are not limited to, a laptop computer, cellular telephone, IP telephone, smart phone, tablet computer, convertible tablet computer, server, computer, workstation, mainframe, virtual machine (whether emulated or on a "bare-metal" hypervisor), container, embedded computer, embedded controller, embedded sensor, personal digital assistant, computing appliance, network appliance, receiver, wearable computer, handheld calculator, or any other electronic, microelectronic, or microelectromechanical device for processing and communicating data. As used herein, the term "network node" (sometimes interchangeably referred to as a "network element," "node,", or ""network device") is meant to encompass routers, switches, gateways, bridges, computers, processors, servers, network appliances, modules, cable boxes, load balancers, firewalls, inline service nodes, proxies, or any other suitable device, component, element, or proprietary appliance operable to exchange information in a network environment in accordance with embodiments described herein. Network nodes described herein may include any suitable hardware, software, components, modules, or interfaces that facilitate the operations thereof, and may be inclusive of appropriate algorithms and communication protocols that allow for the effective exchange of data or information. The terms "upstream" and "downstream" as used herein refer to the flow of traffic from a source to a receiver. An "upstream network node" (or simply an "upstream node") refers to an ingress node that the source is communicatively connected to (i.e. a network node through which the source injects traffic into the network). A "downstream network node" (or simply a "downstream node") refers to an egress node that the host is communicatively connected to (i.e. a network node through which the traffic is ejected from the network and provided to further devices, e.g. to a receiver). Network nodes may operate as both upstream and downstream nodes for different traffic flows.

As will be appreciated by one skilled in the art, aspects of the present disclosure, in particular a functional entity performing embodiments of the methods described herein, may be embodied in various manners. Accordingly, various aspects of the present disclosure relate to systems, computer programs, mechanisms, and means for carrying out the methods according to various embodiments described herein. Such systems, computer programs, mechanisms, and means could be included within various network nodes, such as e.g. switches and routers, of a network environment, or distributed among a plurality of network nodes. A computer program may, for example, be downloaded (updated) to the existing network devices and systems (e.g. to the existing routers, switches, various control nodes within a network environment, etc.) or be stored upon manufacturing of these devices and systems.

In yet another aspect, the present application relates to one or more non-transitory computer readable storage media encoded with software comprising computer executable instructions and, when executed by a processor of a computer, operable to carry out the method according to various embodiments described herein.

In yet another aspect, the present application relates to various data structures to be used in messages exchanged within a network environment. In one embodiment, such a data structure may be included within PIM update messages. In another embodiment, such a data structure may be included within path list messages proposed herein.

Example Embodiments

For purposes of illustrating certain example techniques for distributing network path information in a network environment described herein, it is important to understand the communications that may be traversing the network. The following foundational information may be viewed as a basis from which the present disclosure may be properly explained. Such information is offered for purposes of explanation only and, accordingly, should not be construed in any way to limit the broad scope of the present disclosure and its potential applications.

As the subscriber base of end users increases, proper routing and efficient management of communication sessions and data flows becomes critical. Internet Protocol (IP) communications generally provide different types of communication methods across a network, e.g. unicast and multicast.

Unicast is a method of point-to-point communication, and it is typically used when two nodes need to exchange data, where neither node is concerned with sharing the data with multiple hosts (also referred to as "destinations"). In unicast routing, unicast data, in the form of unicast packets, is sent from a single source to a single host (i.e. a single destination). The packets are routed by network devices, such as routers, towards a destination address (typically an IP address) of the desired host. The source address of a unicast packet plays little or no part in routing of unicast data, with the unicast packets being routed based on their destination address.

Multicast is a method of sending data over a computer network from a single source to multiple hosts. Multicast communications can allow a certain group of hosts to receive messages without having to broadcast those messages to all of the hosts in the broadcast domain.

Multicast is a bandwidth-conserving technology that reduces traffic in a network by simultaneously delivering data to multiple select hosts. To that end, multicast leverages the concept of a group, where a multicast group is an arbitrary group (G) of hosts that express an interest in receiving a particular data stream from a source (S), e.g. to view a particular channel of an Internet-based television program provider. In multicast routing, multicast data, in the form of multicast packets, is sent from a source (S) address to a multicast group (G) address that is common to the hosts in the group. Hence, any multicast transmission has a multicast group address, G. A multicast group can receive data from more than one source, and each such source can also have a regular (class A, B, and C) internet address (S). The notation (*, G) generally means every possible source for a given group G, while the notation (S, G) means a particular source, at a particular Internet address S, for a given group G. Hosts which are members of a given multicast group can receive multicast data sent to that group.

A host seeking to receive data sent to a multicast group can join the group using, for example, Internet Management Group Protocol (IGMP), a protocol used by hosts and by multicast-enabled routers to form and manage multicast groups. To join a group, a host typically sends an IGMP membership report, also referred to as an "IGMP join" message, to a local multicast router associated with the host, the local multicast router commonly referred to as a "downstream router" or, more generally, as a "downstream node." The membership report can indicate to the downstream node that the host is interested in joining a particular multicast group. The address of the multicast group is often included in the membership report because the address is indicative of which multicast data the host is interested in receiving. The downstream node, recognizing that the host wishes to join the group, establishes a path from a remote router associated with the source, the remote multicast router commonly referred to as an "upstream router" or, more generally, as an "upstream node," to itself (i.e. to the downstream node), and then forwards received multicast data to the host accordingly.

In unicast routing, traffic is routed through the network along a single path from the source to the destination host. A unicast router is indifferent to the source address; it only evaluates the destination address and how to forward the traffic toward that destination. The router typically scans through its routing table, and then forwards a single copy of the unicast packet out of the correct interface in the direction of the destination. In multicast routing, the source is sending traffic to an arbitrary group of hosts represented by a multicast group address. The multicast router determines which direction is upstream (toward the source) and which direction (or directions) is downstream. If there are multiple downstream paths, the router replicates the packet and forwards the traffic down the appropriate downstream paths. This concept of identifying the path to reach the source, in order to get the traffic from the source via the same path, is known as reverse path forwarding (RPF). RPF is a fundamental concept in multicast routing that enables routers to correctly forward multicast traffic down the distribution tree. RPF makes use of the existing unicast routing table to determine the upstream and downstream neighbors. A router can forward a multicast packet when it is received on an upstream interface.

The term Live-Live (also referred to as Hot-Hot) offers a method of sending redundant data streams through the network using path separation and dedicated infrastructure. For example, an A copy of the streams would be sent to one set of multicast groups and a B set of streams would be sent using a second set of multicast groups. Each of these groups will theoretically be delivered using a parallel, but a separate, set of equipment to the end user with physical path separation.

Protocol-independent multicast (PIM) is a family of multicast routing protocols for IP networks that provide one-to-many and many-to-many distribution of data over a local area network (LAN), a wide area network (WAN), or the Internet. PIM gets its name from the fact that it is independent of any specific IP routing protocol because it does not include its own topology discovery mechanism, but instead uses routing information supplied by other routing protocols. PIM can leverage the unicast routing protocols being used to populate the unicast routing tables. PIM uses this unicast routing information to perform the multicast forwarding function and, thereby, makes the mechanism protocol-independent. Although PIM is called a multicast routing protocol, it can use the unicast routing table to perform the RPF check function, instead of building a completely independent multicast routing table.

PIM allows distributing network path information and connecting the network nodes in a given path by employing so-called PIM join/prune messages. Conventional implementation of PIM is illustrated in FIG. 1 showing a schematic illustration of a network environment 100.

As shown in FIG. 1, a network within the network environment 100 includes a plurality of network nodes, shown as network nodes R1-R7 and network nodes R22-R55. Illustration, in FIG. 1, of a host H1 being connected to the node R1 is intended to indicate that the node R1 is a downstream node (i.e. the egress node associated with the host H1). On the other hand, illustration of a source S0 being connected to the node R6 is intended to indicate that the node R6 is an upstream node (i.e. the ingress node associated with the source S0). Links within various network nodes shown in FIG. 1 are intended to illustrate various paths between the downstream node R1 and the upstream node R6.

Consider that the host H1 sends an IGMP join message 102 to the downstream node R1, indicating that the host wants to join a certain multicast group G. Consider also that the path from the downstream router R1 to the upstream router R6 is e.g. a path {R2, R3, R4, R5, R6}. In various embodiments, e.g. one of dynamic computation methods at the downstream router or static configuration of the downstream router (e.g. by a network operator) may be responsible for determining the path. FIG. 1 illustrates that, in conventional implementations, in order to set up this specified path for providing requested multicast traffic from the source S0 to the host H1, the downstream router R1 will send a PIM join/prune message to the first node in the sequence of nodes specified by the path (i.e. to the RPF neighbor for the downstream router R1 in the sequence of nodes specified by the path). In the exemplary sequence {R2, R3, R4, R5, R6}, that would be the node R2, and FIG. 1 illustrates a PIM join/prune message 104 being sent from R1 to R2. Such a message would include an identification of a multicast group that host H1 indicated the desire to join, an identification of a source which can provide requested multicast traffic (i.e. S0), and a complete path list {R2, R3, R4, R5, R6}, i.e. a sequence of nodes from the downstream node to the upstream node.

Each network node typically includes interfaces, fabric card modules, and programming logic. The interfaces are configured to receive and send multicast packets. The fabric card modules are configured to provide high-speed data forwarding connectivity for the interfaces within the network node. The programming logic is configured to implement programming of multicast entries in the node and may further be configured to implement the functionality of network path distribution as described herein.

Upon receiving such a PIM join/prune message, node R2 will create (S0, G) forwarding entry in its multicast forwarding table. Such a forwarding entry would contain a field containing an identification of an upstream interface of R2 to be used for receiving multicast traffic and one or more fields containing identifications of one or more downstream interfaces of R2 to be used for forwarding the received multicast traffic in order to get the traffic to host H1 via the path specified in the PIM join/prune message. Example interfaces are shown as interfaces 1220 of an exemplary system, e.g. any of the network nodes of FIG. 1, configured to perform embodiments of the present disclosure, shown in FIG. 12 and described in greater detail below. For this example, R2 will configure an interface to node R3 as an upstream interface for receiving multicast traffic destined to the host H1 (because R3 is the next node, from R2, in the sequence) and will configure an interface to node R1 as a downstream interface for forwarding the multicast traffic destined to host H1 (because R1 is the node that immediately precedes node R2 in the sequence {R2, R3, R4, R5, R6}). R2 will further determine whether it is the upstream node for the received path. In the example illustrated, R2 is not the upstream node and, therefore, R2 will re-originate another PIM join/prune message and send it to the next node in the sequence of nodes specified by the path (i.e. to the RPF neighbor for the node R2 in the sequence of nodes specified by the path). In the exemplary sequence {R2, R3, R4, R5, R6}, that would be the node R3, and FIG. 1 illustrates a PIM join/prune message 104 being sent from R2 to R3. All of the subsequent nodes, i.e. R3-R6 in this example, will perform the functionality as described for R2. In this manner, the PIM join/prune messages will propagate through the network from the downstream node to the upstream node in accordance to the specified path, configuring each node in the path to forward multicast traffic from the source S0 to the host H1 also in accordance with the specified path, i.e. upstream node R6 will forward multicast traffic received from the source S0 and destined for the multicast group requested by the host H1 to node R5, R5 will forward the traffic received from R6 to R4, and so on.

If there is a change in the path that was previously specified, e.g. an updated path between the downstream node R1 and the upstream node R6 should now be {R2, R3, R4, R7, R6}, i.e. node R5 is replaced by node R7, then the PIM join/prune messages carrying the updated path are re-sent by each of the nodes involved, starting with the downstream node R1. Each node receiving a PIM join/prune message with updated path information will re-process the entire message in the manner described above and re-send the message to join with the subsequent nodes, in accordance with the updated path.

Each node receiving a PIM join/prune message will also determine whether any of the previously established connections for carrying the multicast traffic from S0 to H1 are to be pruned (i.e. eliminated), as known in the art. In this example, node R4 will determine that connection to R5 is to be pruned and a new connection, to R7, is to be established. Therefore, R4 will send a PIM join/prune message to node R7 initiating creation of a link between R4 and R7 and will send a PIM join/prune message to R5 initiating pruning of a link between R4 and R5.

As described above, such a conventional implementation is problematic because PIM join/prune messages can, and often do, get very large due to the encoding of explicit paths, and, if there are changes to a path, all of the PIM join/prune messages have to be re-sent and re-processed by each of the network nodes involved even though the change may not affect those nodes. For example, a change from a path {R2, R3, R4, R5, R6} to a path {R2, R3, R4, R7, R6} does not affect multicast traffic forwarding of nodes R3, R2, and R1 because, for both the original and the updated paths, these nodes receive multicast traffic from the same upstream interface (in this example—R3 receives multicast traffic from the upstream interface to node R4, R2 receives multicast traffic from the upstream interface to node R3, and R1 receives multicast traffic from the upstream interface to node R2) and forward the received multicast traffic on the same downstream interface (in this example—R3 forwards multicast traffic via the downstream interface to node R2, R2 forwards multicast traffic via the downstream interface to node R1, and R1 forwards multicast traffic via the downstream interface to host H1).

Embodiments of the present disclosure aim to reduce wasteful use of processing resources and bandwidth in a network environment described above by using identifiers of network paths and using new path list messages and PIM join/prune messages carrying the identifiers instead of the explicit paths, as will now be described in greater detail.

Figure 2:
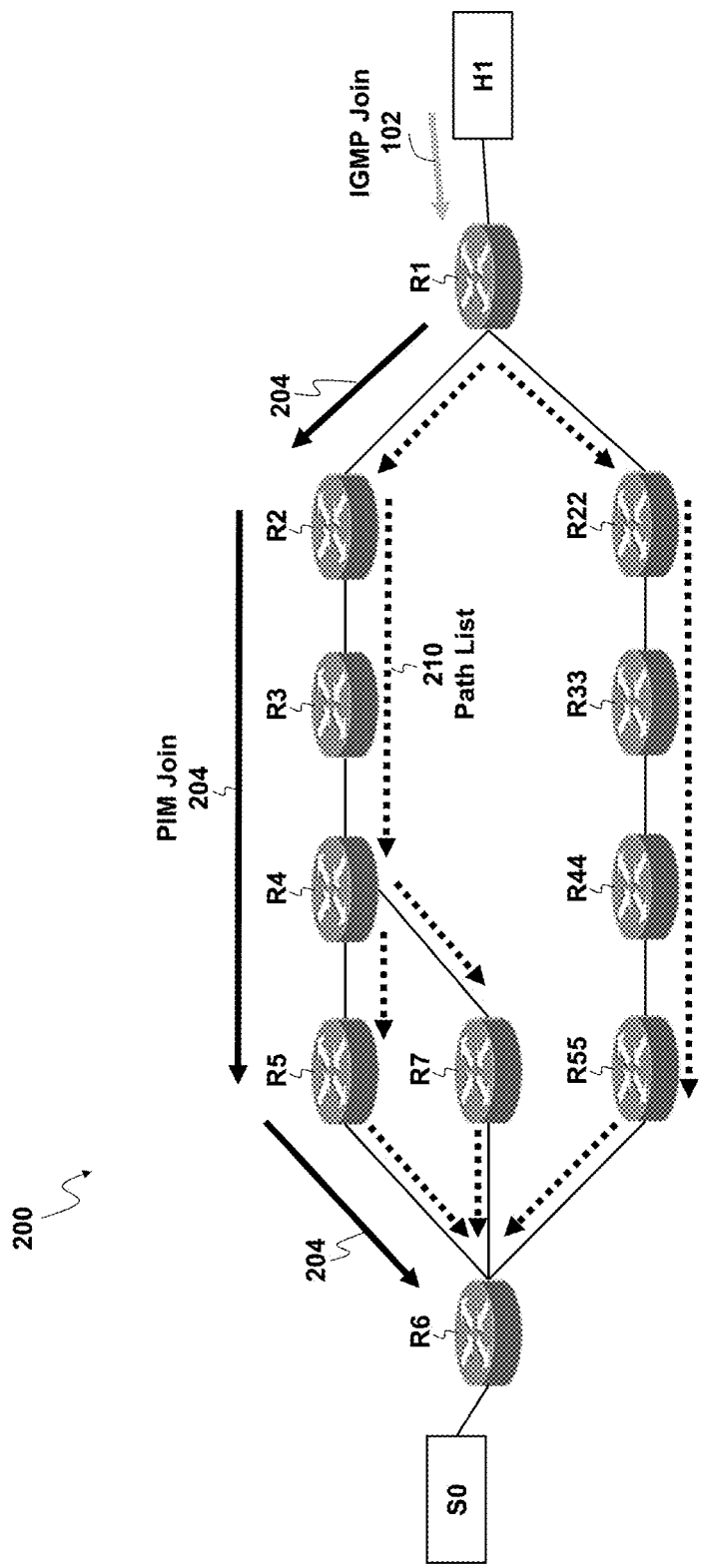
FIG. 2 is a simplified block diagram illustrating an exemplary network environment configured to distribute network path information using path list messages and PIM join/prune messages, according to some embodiments of the present disclosure.

FIG. 2 is a simplified block diagram illustrating an exemplary network environment 200 configured to distribute network path information using path list messages and PIM join/prune messages, according to some embodiments of the present disclosure.

The network environment 200 shown in FIG. 2 is merely one example in which embodiments of the present disclosure may be implemented, namely an example illustrating a particular number of network nodes and particular connections between these nodes. Thus, while the network environment 200 shown in FIG. 2 illustrates a certain number of sources, a certain number of hosts, a certain number of network nodes, and certain connections between sources, hosts, and network nodes, embodiments of the present disclosure are applicable to any number of sources, hosts, and network nodes, and any connections between those. Furthermore, while described with reference to PIM, a skilled person will readily recognize that teachings provided herein are equally applicable to other protocols and other network architectures and deployments, and may be used with messages similar to but not limited to PIM, all of which being within the scope of the present disclosure.

The network environment 200 shown in FIG. 2 represents a series of points or nodes of interconnected communication paths for receiving and transmitting packets of information that propagate through the network environment. The network environment 200 offers a communicative interface between nodes (e.g., various network elements within the TOR, etc.), and may include any type or topology of one or more networks such as a local area network (LAN), wireless local area network (WLAN), metropolitan area network (MAN), virtual local area network (VLAN), Intranet, Extranet, wide area network (WAN) such as the Internet, virtual private network (VPN), any other appropriate network configuration, or any suitable combination thereof that facilitates communications in the network environment 200. Network nodes of the network environment 200 may include any number of hardware or software elements coupled to (and in communication with) each other through a communications medium. Elements of FIG. 2 may be coupled to one another through one or more interfaces employing any suitable connections (wired or wireless), which provide viable pathways for network communications. Additionally, one or more of these elements may be combined, divided, or removed from the architecture based on particular configuration needs. For ease of illustration, not all elements of FIG. 2 are depicted with communication lines traversing the network environment 200.

In the network environment 200, network traffic, which could include packets, frames, signals, cells, datagrams, protocol data units (PDUs), data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). A packet is a unit of data for communicating information in a network, and can be routed between a source node and a destination node via a network. A packet may include, but is not limited to, a source network address, a destination network address, and a payload containing the information/data to be communicated. By way of example, these network addresses can be Internet Protocol (IP) addresses in a TCP/IP messaging protocol. Information is generally represented by data and, as used herein, 'data' refers to any type of binary, numeric, voice, video, media, textual, or script data, or any type of source or object code, or any other suitable information in any appropriate format that may be communicated from one point to another in electronic devices and/or networks.

Comparison of FIGS. 1 and 2 reveals that the network environments 100 and 200 are very similar. Indeed, unless explained otherwise, the explanations provided above for FIG. 1 are applicable to the network environment 200 and, therefore, in the interests of brevity, are not repeated.

As shown in FIG. 2, in the network environment 200, downstream nodes, such as e.g. the downstream node R1, are configured to send not only PIM join/prune messages but also send path list messages, shown as a PIM Path List message 210. In order to not clutter the drawing, only one path list message is labeled in FIG. 2, but all dotted arrows shown in the network environment 200 are intended to illustrate propagation of such a path list messages. Thus, as can be seen in the network environment 200, each path list message as described herein is propagated to each of the network nodes by the network nodes passing the path list message to its peers, i.e. in a hop-by-hop manner, a process known as "flooding" of messages in a network. In contrast, as can also be seen in the network environment 200 with solid arrows labeled as a PIM join/prune message 210, such messages are advertised by each node only to its RPF neighbor in a given sequence of nodes according to a given network path. FIG. 2 illustrates one example for the PIM join/prune message 210 being advertised for a particular exemplary network path that includes a sequence of nodes {R2, R3, R4, R5, R6}, PIM join/prune messages (i.e. from R1 to R2, from R2 to R3, etc.). Of course, when a different path is to be advertised, the PIM join/prune message 210 would traverse the sequence of network nodes in accordance with that path.

Figures 3A, 3B, 3C:
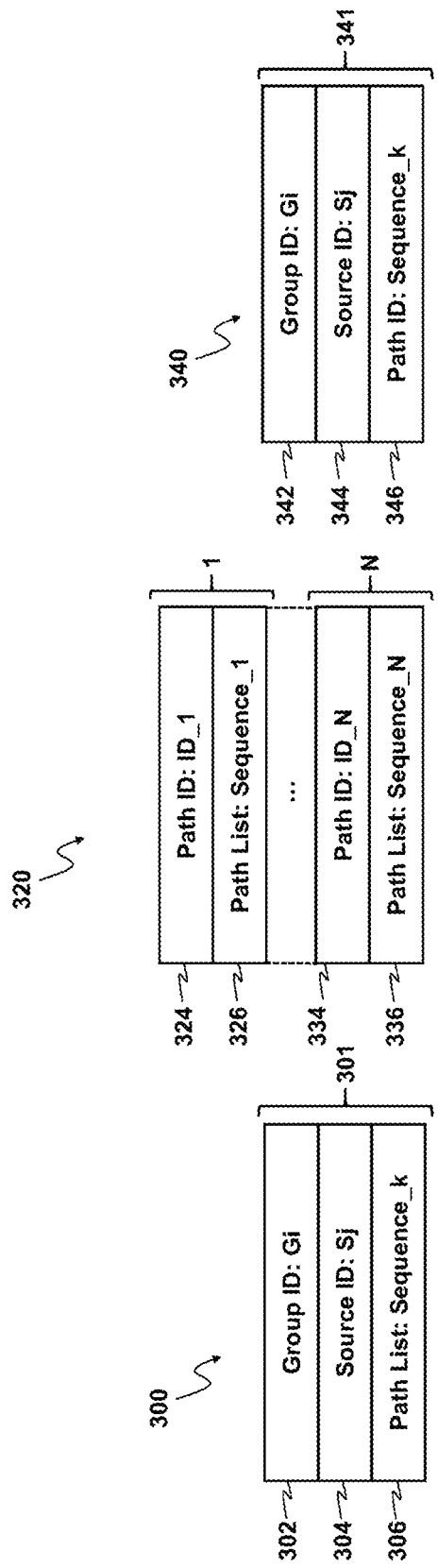
FIG. 3A illustrates an example of a conventional PIM join/prune message for announcing one or more paths to one or more sources.
FIGS. 3B and 3C illustrate, respectively, a path list message and a PIM join/prune message for announcing one or more paths to one or more sources, according to some embodiments of the present disclosure.

FIGS. 3A-3C provide examples of, respectively, a conventional PIM join/prune message (e.g. a message as shown in FIG. 1), a path list message as proposed herein, and a PIM join/prune message as proposed herein for announcing one or more paths to one or more sources in the network environment 200 shown in FIG. 2.

FIG. 3A illustrates a conventional PIM join/prune message 300 which would include at least one field 302 encoding an identification of a multicast group, e.g. a group Gi (where the index "i" indicates that it could be any one of the multicast groups which may be supported in the network environment 200, e.g. G1, G2, G3, etc.), that a host, e.g. host H1, indicated the desire to join. The conventional PIM join/prune message 300 further includes a field 304 encoding an identification of a multicast source, e.g. a multicast source Sj (where the index "j" indicates that it could be any one of the multicast sources which may be send requested multicast traffic to the group Gi specified in the field 302). In addition, the conventional PIM join/prune message 300 also includes a field 306 encoding an explicit path from a downstream node for the host that requested multicast traffic to an upstream node associated with the source identified in the field 304. The explicit path is shown in the field 306 as "Sequence_k" indicating that the explicit path is a sequence of two or more network nodes from the downstream node to the upstream node (the index "k" indicates that it could be any one of the possible network paths supported by the network environment 200 for delivering requested multicast traffic from the source Sj specified in the field 304 to the group Gi specified in the field 302). In a sequence of a given path, one or more nodes between the downstream and the upstream nodes are referred to herein as "intermediate" nodes.

The fields 302, 304, and 306 may be logically connected within the PIM join/prune message 300, forming a set 301, to indicate to network nodes receiving and processing them, that the information encoded in these fields is associated with one another. In general, the PIM join/prune message 300 may include additional sets 301, specifying groups, sources, and explicit paths lists as known in the art. In some embodiments, when two or more different sets refer to the same group, they may include only one field specifying the group for all of them (as e.g. shown in FIG. 6A, described below). The PIM join/prune message 300 may e.g. be sent as the PIM join/prune message 104 shown in FIG. 1.

FIG. 3B illustrates an exemplary path list message 320, which, together with a new PIM join/prune message 340 shown in FIG. 3C, may be used in the network environment 200 as the path list message 210 and the PIM join/prune message 204, respectively, in accordance with various embodiments described herein. As shown in FIG. 3B, the path list message 320 includes N sets of fields, labeled as sets 1 . . . N, where N is an integer equal to or greater than 1. Each set includes a first field encoding a different explicit network path from a downstream node for a host that requested multicast traffic to an upstream node associated with the source (e.g. field 324 of set 1 and field 334 of set N), and a second field (e.g. field 326 of set 1 and field 336 of set N) encoding a different identifier assigned to represent the network path specified in the first field. According to various embodiments of the present disclosure, two network paths are considered to be different when a sequence of network nodes specified by one network path includes at least one network node not present in the sequence of network nodes specified by another network path, or when the order of the network nodes within those sequences is different. Thus, a new identifier is assigned to each new network path. Furthermore, in some embodiments, the same network paths specified for different sources, groups, or hosts may be assigned the same identifiers, if updates in those paths are expected to be applicable to all of these sources/groups/hosts. In other embodiments, the same network paths specified for different sources, groups, or hosts may be assigned different unique identifiers, if updates in those paths are not expected to be applicable to all of these sources/groups/hosts. The path list message 320 may e.g. be sent as the PIM Path List message 210 shown in FIG. 2.

In various embodiments, an identifier associated with a specified network path for forwarding multicast traffic may be any value that allows uniquely identifying that network path within a given network. For example, in some embodiments, such an identifier may be a unique e.g. 32-64-bit value in that network domain.

FIG. 3C illustrates an exemplary PIM join/prune message 340 which may be sent as the PIM join/prune message 204 shown in FIG. 2. As shown in FIG. 3C, similar to the conventional PIM join/prune message 300, the PIM join/prune message 340 include at least one field 342 encoding an identification of a multicast group, e.g. a group Gi, that a host, e.g. host H1, indicated the desire to join (i.e. the field 342 of the PIM join/prune message 340 is similar to the field 302 of the PIM join/prune message 300). Also similar the conventional PIM join/prune message 300, the PIM join/prune message 340 further includes a field 344 encoding an identification of a multicast source, e.g. a multicast source Sj (i.e. the field 344 of the PIM join/prune message 340 is similar to the field 304 of the PIM join/prune message 300). In contrast to the conventional PIM join/prune message 300, the PIM join/prune message 340 further includes a field 346 encoding an identification of the identifier associated with a network path specified for the multicast group encoded in the field 342 and for the multicast source encoded in the field 344 (i.e. the field 346 of the PIM join/prune message 340 is different from the field 306 of the PIM join/prune message 300 in that the former only includes an identifier of a network path while the latter includes the sequence of nodes, i.e. the network path itself). In contrast to conventional implementations, not having to encode the actual path list in the field 346 of the PIM join/prune message 340 advantageously reduces the size of the PIM join/prune message 340.

The fields 342, 344, and 346 are logically connected within the PIM join/prune message 340, forming a set 341, to indicate to network nodes receiving and processing them, that the information encoded in these fields is associated with one another. In general, the PIM join/prune message 340 may include additional sets 341, specifying groups, sources, and explicit paths lists as known in the art. In some embodiments, when two or more different sets refer to the same group, they may include only one field specifying the group for all of them (as e.g. shown in FIG. 6C, described below).

Besides the fact that the PIM join/prune messages 340 include identifiers of network paths instead of the actual network paths themselves, and besides the fact that the PIM join/prune messages 340 may not have to be re-originated by a network node if a path update does not affect the configuration of the node with respect to its' immediate peer nodes (described in greater detail below), the PIM join/prune messages 340 may be organized, transmitted, and processed as known in the art for the conventional PIM join/prune messages used to distribute multicast network path information in a network environment, all of which being within the scope of the present disclosure.

In some embodiments, the sets 1 . . . N of a single path list message 320 may include path lists which would be sent in separate PIM join/prune messages 340. In other words, there does not have to be a one-to-one correspondence between the sets of a given PIM join/prune message 340 and a given path list message 320 (and for that reason the sets of these messages are labeled in FIGS. 3B and 3C differently). Such embodiments may be advantageous in that a downstream node may first collect a plurality of network paths to be announced and then announce all of them in a single path list message.

Each network node in the network environment 200, upon receiving the path list message 210, e.g. the path list message 320, will store the association between the path identifier encoded in one field of a set (e.g. encoded in the field 324) and the explicit path list encoded in another field of the same set (e.g. encoded in the corresponding field 326). The network node will do so for each of the N sets included in the path list message 210. Any manner of storing this information extracted from the path list messages that will allow the network node to later obtain the explicit path list based on a given identifier, e.g. as received within the PIM join/prune message 210, e.g. the message 340, as described herein, is within the scope of the present disclosure.

Upon receiving the PIM join/prune message 204, e.g. the PIM join/prune message 340, each node will obtain an identifier from one field of a set (e.g. encoded in the field 346), access the associations between identifiers and explicit network paths which were assembled based on information of the path lit messages 210, and use the identifier indicated in a given field of a PIM join/prune message 340 to obtain the actual explicit path associated with that identifier. Thus, if the field 346 encodes an identifier ID_1, then the node will determine that the associated sequence of network nodes is Sequence_1, as can be seen from the path list message 320 shown in FIG. 3B.

Once the node obtained the actual path list for each of the identifiers encoded in the PIM join/prune message 204, the node can process them as known in the art for processing the PIM join/prune messages 104, as described above (e.g. create a multicast forwarding entry in its table, configure its upstream and downstream interfaces, etc.), except, again, for when there is a path update, which will now be described.

Consider a case that there is a path update to one network path for which the information was announced in the network environment 200, i.e. the path list for a given group and a given source becomes a different. For example, with reference to the nodes shown in FIG. 2, consider that the Sequence_1 was originally a sequence {R2, R3, R4, R5, R6}, but then it changes to a sequence {R2, R3, R4, R7, R6}. As is shown in FIG. 3B, path identifier ID_1 was assigned to that sequence (field 324, corresponding to field 326, within the path list message 320). To announce this path update, the downstream node R1 will re-transmit the path list message 320 but, this time, the field 326 will encode the updated sequence of nodes: Sequence_2 (i.e. this time it will encode sequence {R2, R3, R4, R7, R6}). The field 324 encoding the path identifier associated with the updated sequence will remain the same, i.e. ID_1. All of the nodes receiving the re-transmitted path list message 320 with the updated sequence Sequence_2 will process the message 320 as described above and update the associations between identifiers and sequences accordingly.

In some embodiments of the present disclosure, in order to achieve further advantages enabled by using the identifiers, distribution of PIM join/prune messages in case of a path update may be modified, compared to conventional implementation.

As described above, according to conventional implementations, when there is a change in the path that was previously specified, then the PIM join/prune messages carrying the updated path are re-sent and re-processed by each of the nodes involved, starting with the downstream node R1. In contrast to that inefficient implementation, according to embodiments of the present disclosure, not all of these PIM join/prune messages need to be re-sent and re-processed. Namely, each network node in the network environment 200, in response to receiving a subsequent path list message 210 specifying a different sequence for a given path identifier provided to the node before, is configured to check whether the node that is next to that node in the updated sequence (i.e., the new next node) is different from the next node specified by the previous sequence (i.e. the old next node).

If the new next node is not the same as the old next node, than the node will send an appropriate PIM join message to the new next node specified by the updated sequence and configure its' upstream interface to receive multicast traffic from the new next node. The PIM join message will include the group ID and source ID for the network path, which two IDs have not changed, the PIM join message will further include the path identifier identifying the updated path (which is the same identifier as the one that was used for the old path). The node will also send a PIM prune message to the old next node, thereby pruning (i.e. eliminating) the link to the old next node for receiving multicast traffic from it. Pruning may be performed as known in the art, except that now the PIM prune messages will be messages like the message 340, i.e. include the identifier instead of the actual path list being pruned.

If the new next node is the same as the old next node, then the node does not need to do anything further because the path update does not affect that node. In such a case, transmission of a PIM join/prune message as was done in the prior art is suppressed or prevented, because the link to the next node of the updated sequence is already in place and the interfaces of the node have already been properly configured.

As the foregoing illustrates, in contrast to the conventional implementation as described with reference to FIG. 1, introducing an identifier for each unique network path specified in path list messages and then only using the identifiers in the PIM join/prune messages, instead of the network paths themselves, advantageously allows reducing the number of messages traversing the network because PIM join/prune messages can be made significantly smaller and the same paths don't have to be repeated for each source, group, or host. In addition, in case there is a path update, only network nodes for which the next node in the updated sequence is different from the next node in the previous sequence, will send PIM join/prune messages to the next nodes, which messages will, again, carry path identifiers instead of the explicit paths. This will further reduce the amount of messages traversing the network as well as reduce processing burden on the nodes.

Some exemplary scenarios and exemplary messages of using the identifiers according to various embodiments of the present disclosure will now be described.

FIGS. 4A-4C provide examples of, respectively, a conventional PIM join/prune message, a path list message as proposed herein, and a PIM join/prune message as proposed herein for the example of a network path {R2, R3, R4, R5, R6} to the source S0 being announced by the downstream node R1 in response to receiving an IGMP join message indicating that H1 wishes to join a multicast group G1 (the example shown in FIG. 2).

FIG. 4A illustrates a conventional PIM join/prune message 400 (in this case, a "join" message), which is an example of the PIM join/prune message 300 shown in FIG. 3A. In this example, as shown in FIG. 4A, in the conventional implementation, the field 302 would encode the identification of group G1, the field 304 would encode the identification of multicast source S0, and the field 306 would encode the sequence of nodes {R2, R3, R4, R5, R6} as the explicit network path specified for this multicast transmission.

FIG. 4B illustrates an exemplary path list message 420, according to embodiments of the present disclosure, which is an example of the path list message 320 shown in FIG. 3B. In this example, as shown in FIG. 4B, the field 326 would encode the explicit {R2, R3, R4, R5, R6}, while the field 324 would encode an identifier assigned to that path, the identifier shown in FIG. 4B as an "ID_1", indicating that it identifies the particular sequence of network nodes representing a desired network path encoded in the field 324.

FIG. 4C illustrates an exemplary PIM join/prune message 440 (in this case, a "join" message), according to embodiments of the present disclosure, which is an example of the PIM join/prune message 340 shown in FIG. 3C. In this example, as shown in FIG. 4C, the field 342 would encode the identification of group G1 and the field 344 would encode the identification of multicast source S0, similar to the conventional implementation, but the field 346 would encode an identification of the identifier associated with the specified path {R2, R3, R4, R5, R6} instead of the path itself. Thus, in this example, the field 346 would include the identifier ID_1 which was assigned to the path {R2, R3, R4, R5, R6}.

Figure 5:
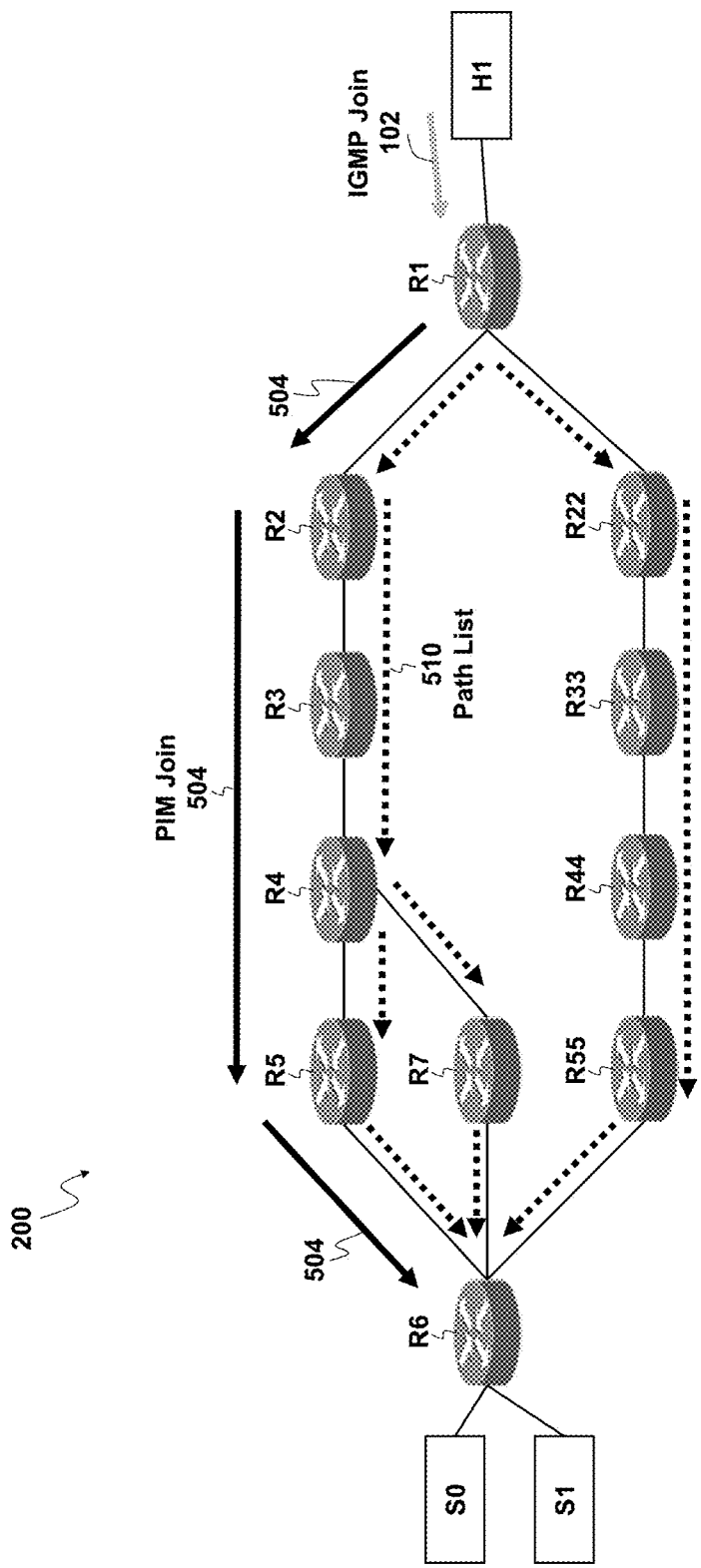
FIG. 5 is a simplified block diagram illustrating an exemplary network environment configured to distribute network path information using path list messages and PIM join/prune messages in which a single path identifier can be used for multiple sources, according to some embodiments of the present disclosure.

FIG. 5 is a simplified block diagram illustrating the network environment 200 as shown in FIG. 2, except that now illustrating an example of distributing network path information using path list messages 510 and PIM join/prune messages 504 in which a single path identifier can be used for multiple sources, according to some embodiments of the present disclosure. The PIM join/prune messages 504 are analogous to the PIM join/prune messages 204/340, and the path list messages 510 are analogous to the path list messages 210/320, shown in FIGS. 2 and 3, described above. In the interests of brevity these descriptions are not repeated here. In addition to the source S0 and the host H1 as shown in FIG. 2, FIG. 5 further illustrates a source S1, with the network node R6 being the upstream node for both sources S0 and S1. In the example of FIG. 5, it is assumed that both sources S0 and S1 belong to the same multicast group, e.g. a group G1, which the host H1 indicated a desire to join, and that both sources S0 and S1 should send multicast traffic via the same path {R2, R3, R4, R5, R6}.

Figures 6A, 6B, 6C:
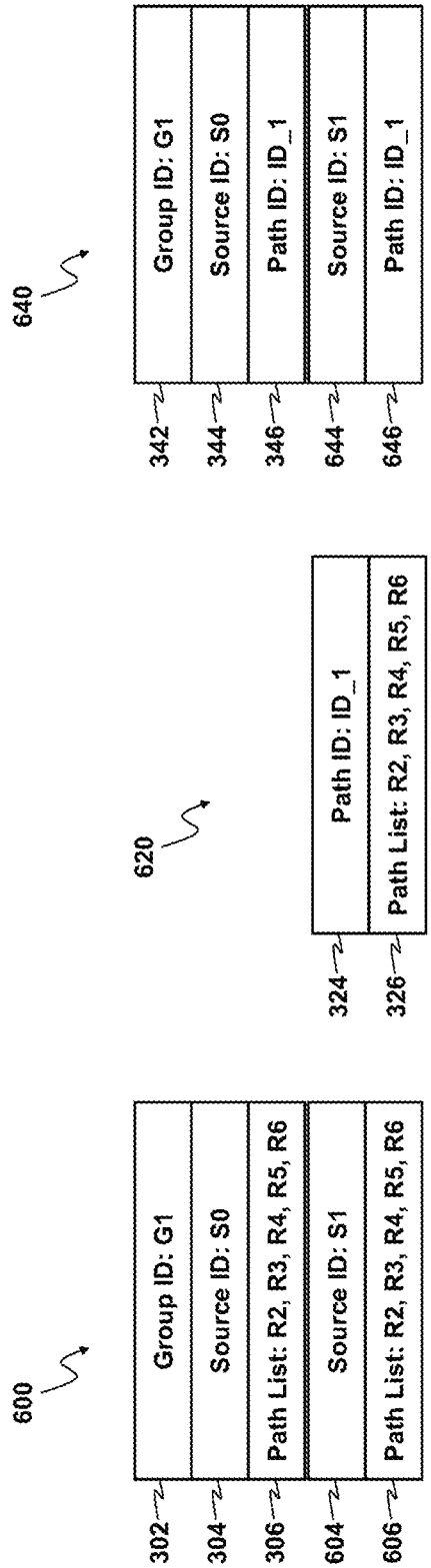
FIG. 6A illustrates an example of a conventional PIM join/prune message for announcing the same path to multiple sources.
FIGS. 6B and 6C illustrate, respectively, a path list message and a PIM join/prune message for announcing the same path to multiple sources, according to some embodiments of the present disclosure.

FIGS. 6A-6C provide examples of, respectively, a conventional PIM join/prune message, a path list message as proposed herein, and a PIM join/prune message as proposed herein for the example of FIG. 5.

FIG. 6A illustrates a conventional PIM join/prune message 600 (in this case, a "join" message), which is an example of the PIM join/prune message 300 shown in FIG. 3A. In this example, as shown in FIG. 6A, in the conventional implementation, the field 302 would encode the identification of group G1, the field 304 would encode the identification of multicast source S0, and the field 306 would encode the sequence of nodes {R2, R3, R4, R5, R6} as the explicit network path specified for this multicast transmission. In addition, as is the case when there are multiple multicast sources in the same group, the conventional PIM join/prune message 600 would also include a field 604, similar to the field 304, but this time encoding an identification of the second multicast source, S1, and would further include a field 606, similar to the field 306, including the same path to the source S1, {R2, R3, R4, R5, R6}, as is the example of FIG. 5. Encoding the same explicit list for each of the multiple sources, as shown in FIG. 6A, can quickly make the PIM join/prune message 600 very large.

FIG. 6B illustrates an exemplary path list message 620, according to embodiments of the present disclosure, which is an example of the path list message 320 shown in FIG. 3B, and which could be used as the path list message 510 shown in FIG. 5. In this example, as shown in FIG. 6B, the field 326 would encode the explicit {R2, R3, R4, R5, R6}, while the field 324 would encode an identifier assigned to that path, the identifier shown in FIG. 6B as an "ID_1", indicating that it identifies the particular sequence of network nodes representing a desired network path encoded in the field 324. A single identifier ID_1 may be used to identify the same sequence {R2, R3, R4, R5, R6} to two different sources.

FIG. 6C illustrates an exemplary PIM join/prune message 640 (in this case, a "join" message), according to embodiments of the present disclosure, which is an example of the PIM join/prune message 340 shown in FIG. 3C, and which could be used as the PIM join/prune message 504 shown in FIG. 5. In this example, as shown in FIG. 6C, the field 342 would encode the identification of group G1 and the field 344 would encode the identification of multicast source S0, similar to the conventional implementation, but the field 346 would encode an identification of the identifier associated with the specified path {R2, R3, R4, R5, R6} instead of the path itself. Thus, in this example, the field 346 would include the identifier ID_1 which was assigned to the path {R2, R3, R4, R5, R6}.

In addition, the same as with the conventional implementation of FIG. 6A, the PIM join/prune message 640 would also include a field 644, similar to the fields 344 and 604, but this time encoding an identification of the second multicast source, S1, and would further include a field 646, similar to the fields 346 and 606, including the same the identifier associated with the specified path {R2, R3, R4, R5, R6} to the source S1 as that included in the field 346, instead of the path itself. Encoding the same identifier for each of the multiple sources, instead of encoding the same complete path for each source, as shown in FIG. 6C, reduces the size of the PIM join/prune message 640 compared to that of the PIM join/prune message 600.

Figure 7:
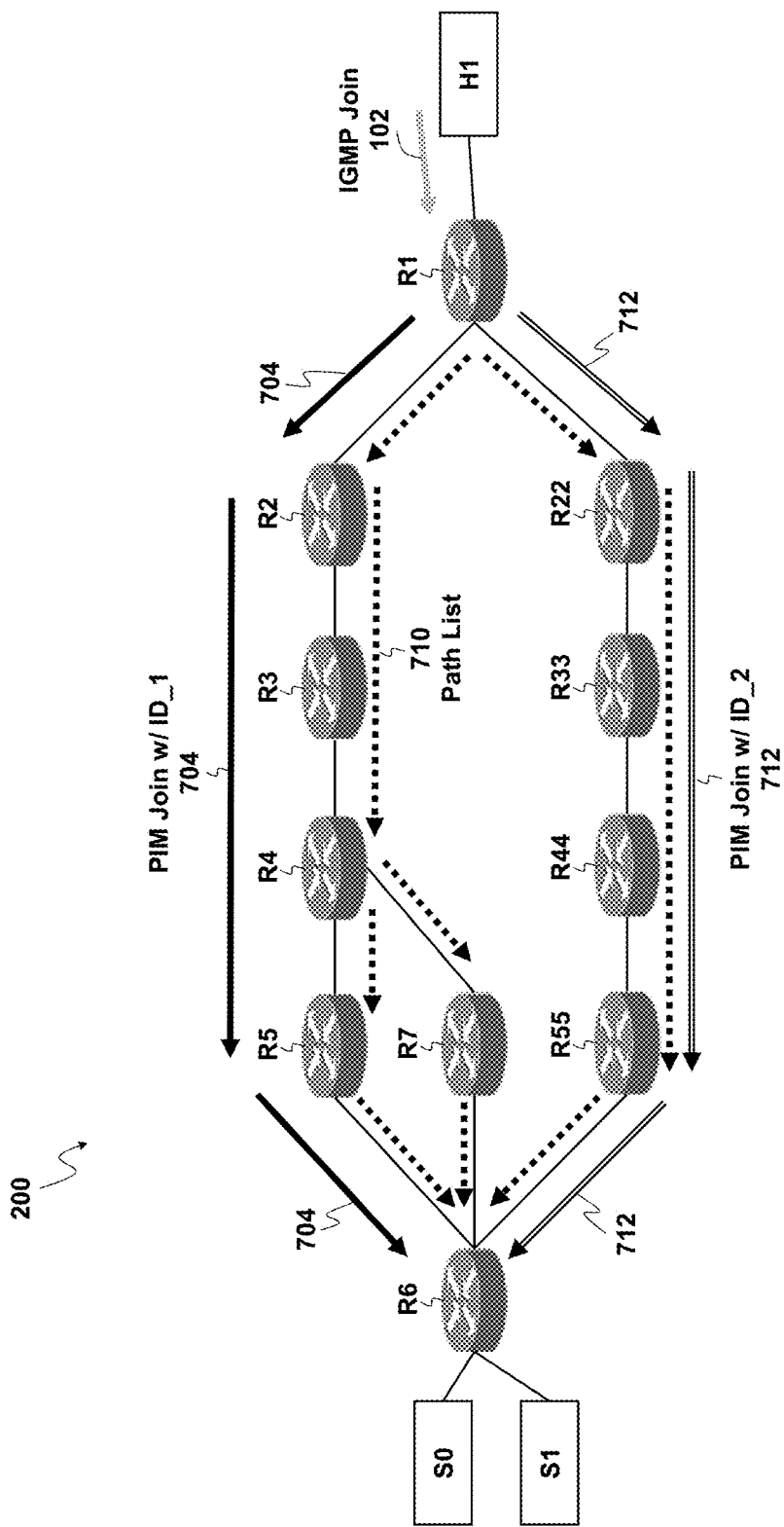
FIG. 7 is a simplified block diagram illustrating an exemplary network environment configured to distribute network path information using path list messages and PIM join/prune messages in which multiple paths and their path identifiers can be announced in a single path list message, according to some embodiments of the present disclosure.

FIG. 7 is a simplified block diagram illustrating the network environment 200 as shown in FIG. 2, except that now illustrating an example of distributing network path information using path list messages 710 and PIM join/prune messages 704 and 712 in which multiple paths and their path identifiers can be announced in a single path list message, according to some embodiments of the present disclosure. Each of the PIM join/prune messages 704 and 712 are analogous to the PIM join/prune messages 204/340, and the path list messages 710 are analogous to the path list messages 210/320, shown in FIGS. 2-3, described above. In the interests of brevity these descriptions are not repeated here. In addition to the source S0 and the host H1 as shown in FIG. 2, FIG. 7 further illustrates a source S1, with the network node R6 being the upstream node for both sources S0 and S1, similar to the example of FIG. 5. Unlike the example of FIG. 5, in the example of FIG. 7, it is assumed that each of the sources S0 and S1 should send multicast traffic via its' respective path. The path for the source S0 is a path {R2, R3, R4, R5, R6}, shown in FIG. 7 by illustrating that the PIM join/prune message 704 traverses that path, and the path for the source S1 is a path {R22, R33, R44, R55, R6}, shown in FIG. 7 by illustrating that the PIM join/prune message 712 traverses that path. The sources S0 and S1 may belong to the same or different multicast groups.

Figure 8:
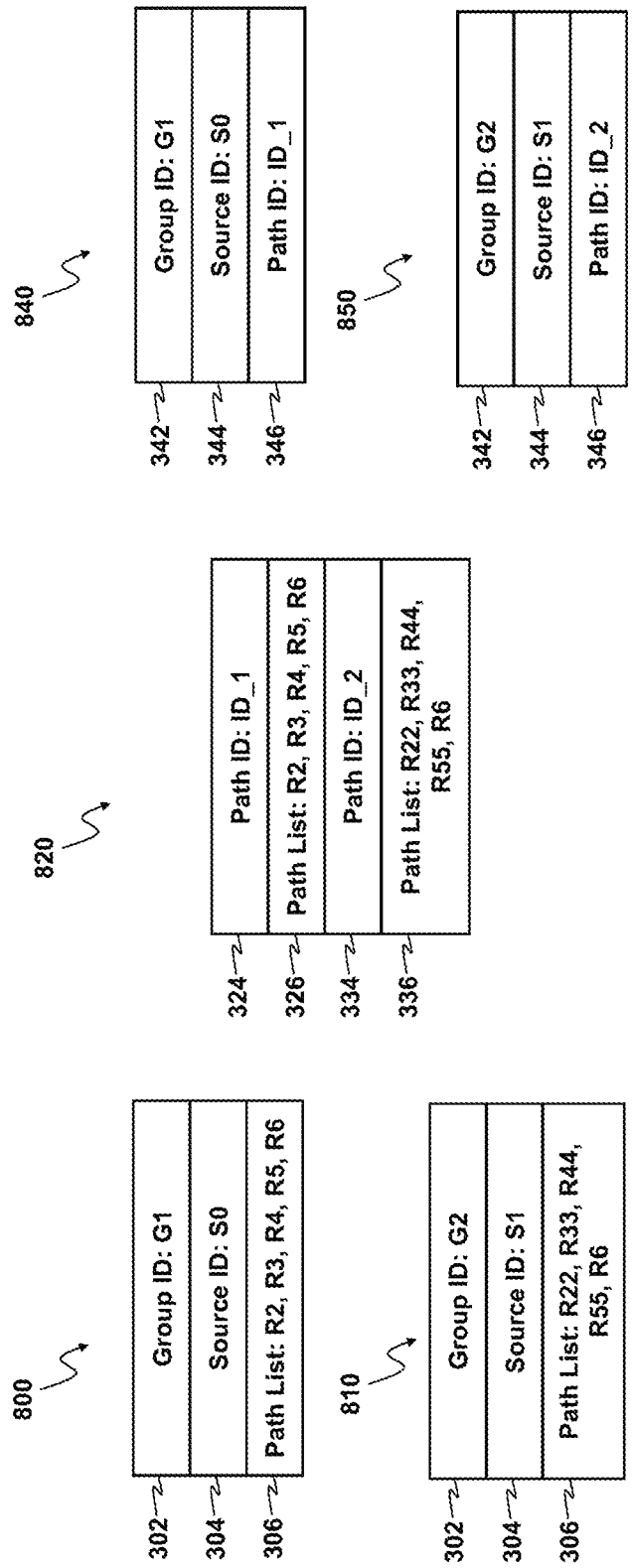
FIG. 8A illustrates an example of conventional PIM join/prune messages for announcing different paths to sources.
FIGS. 8B and 8C illustrate, respectively, a path list message and PIM join/prune messages for announcing different paths to sources, according to some embodiments of the present disclosure.

FIGS. 8A-8C provide examples of, respectively, a conventional PIM join/prune message, a path list message as proposed herein, and a PIM join/prune message as proposed herein for the example of FIG. 7.

FIG. 8A illustrates conventional PIM join/prune messages 800 and 810 (in this case, "join" messages), each of which is an example of the PIM join/prune message 300 shown in FIG. 3A. In this example, the downstream node R1 will announce routes to S0 and S1 in different PIM join/prune messages because the RPF neighbor for the paths for S0 and S1 are different for R1 (its R2 for the path for S0 and its R22 for the path for S1, for the example of FIG. 7). In this example, as shown in FIG. 8A, in the conventional implementation, the field 302 of the PIM join/prune message 800 would encode the identification of group G1 (the group for which the multicast source S0 of FIG. 7 is assumed to provide multicast traffic for), the field 304 would encode the identification of multicast source S0, and the field 306 would encode the sequence of nodes {R2, R3, R4, R5, R6} as the explicit network path specified for this multicast transmission for source S0. Similarly, in the conventional implementation, the field 302 of the PIM join/prune message 810 would encode the identification of group G2 (the group for which the multicast source S1 of FIG. 7 is assumed to provide multicast traffic for), the field 304 would encode the identification of multicast source S1, and the field 306 would encode the sequence of nodes {R22, R33, R44, R55, R6} as the explicit network path specified for this multicast transmission for source S1.

FIG. 8B illustrates an exemplary path list message 820, according to embodiments of the present disclosure, which is an example of the path list message 320 shown in FIG. 3B, and which could be used as the path list message 710 shown in FIG. 7. In this example, as shown in FIG. 8B, the field 326 of the path list message 820 would encode the explicit path {R2, R3, R4, R5, R6} to S0, while the field 324 would encode an identifier assigned to that path, the identifier shown in FIG. 8B as an "ID_1", indicating that it identifies the particular sequence of network nodes representing a desired network path encoded in the field 324. In addition, the path list message 820 further includes the field 336, encoding the explicit path {R22, R33, R44, R55, R6} to S1, and the field 334, encoding an identifier assigned to the path encoded in the field 334, the identifier shown in FIG. 8B as an "ID_2".

FIG. 8C illustrates an exemplary PIM join/prune message 840 (in this case, a "join" message), according to embodiments of the present disclosure, which is an example of the PIM join/prune message 340 shown in FIG. 3C, and which could be used as the PIM join/prune message 704 shown in FIG. 7. In this example, as shown in FIG. 8C, the field 342 of the PIM join/prune message 840 would encode the identification of group G1 and the field 344 would encode the identification of multicast source S0, similar to the conventional implementation shown in FIG. 8A with the message 800, but the field 346 would encode an identification of the identifier associated with the specified path {R2, R3, R4, R5, R6} instead of the path itself. Thus, in this example, the field 346 of the PIM join/prune message 840 would include the identifier ID_1 which was assigned to the path {R2, R3, R4, R5, R6}. Similarly, the field 342 of the PIM join/prune message 850 would encode the identification of group G2 and the field 344 would encode the identification of multicast source S1, similar to the conventional implementation shown in FIG. 8A with the message 810, but the field 346 would encode an identification of the identifier associated with the specified path {R22, R33, R44, R55, R6} instead of the path itself. Thus, in this example, the field 346 of the PIM join/prune message 850 would include the identifier ID_2 which was assigned to the path {R22, R33, R44, R55, R6}.

FIGS. 8B and 8C illustrate that, even though network paths to S0 and S1 are announced via different PIM join/prune messages 840 and 850, these network paths may be announced in a single path list message 820.

An example of FIGS. 7 and 8A-8C could easily be extended to Live-Live embodiments where different paths, e.g. paths {R2, R3, R4, R5, R6} and {R22, R33, R44, R55, R6} as shown in FIG. 7 are specified for reaching a single source S0. In such embodiments, the messages shown in FIGS. 8A-8C would need to replace source S1 with source S0 and group G2 with group G1, but otherwise explanations provided above would still apply.

Figure 9:
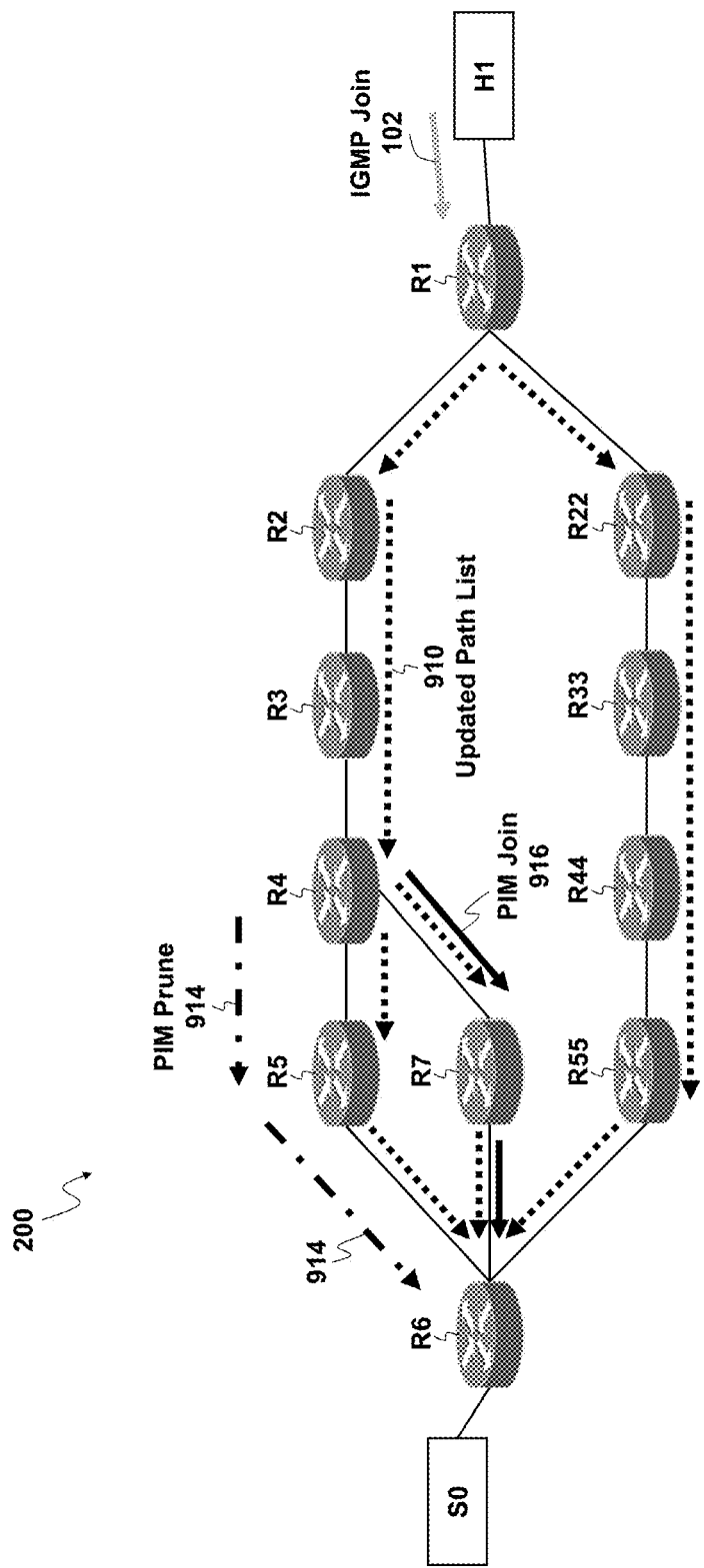
FIG. 9 is a simplified block diagram illustrating an exemplary network environment configured to distribute updated network path information using path list messages and PIM join/prune messages, according to some embodiments of the present disclosure.

FIG. 9 is a simplified block diagram illustrating the network environment 200 as shown in FIG. 2, except that now illustrating an example of an update in the network path from a path {R2, R3, R4, R5, R6} to a path {R2, R3, R4, R7, R6}, according to some embodiments of the present disclosure. FIG. 9 illustrates the path update example described above and assumes that, first path information for the path {R2, R3, R4, R5, R6} was distributed, which can be done as described for the example of FIG. 2 with the messages shown in FIGS. 4A-4B. FIG. 9 illustrates a continuation of this example where the path change occurs, e.g. because the node R5 became dysfunctional. As was described above, when Sequence_1 that was originally a sequence {R2, R3, R4, R5, R6} is updated, e.g. to a Sequence_2 that includes nodes {R2, R3, R4, R7, R6}, the downstream node R1 will re-transmit the path list message, as shown in FIG. 9 with a path list message 910. The path list message 910 is analogous to the path list message announcing the Sequence_1 earlier, i.e. the message as shown in FIG. 4B, but, this time, it will carry the updated sequence of nodes (i.e. this time it will encode sequence {R2, R3, R4, R7, R6}). The path list message 910 will still be flooded to all network nodes in the network environment 200, as shown in FIG. 9 with the dotted arrows. On the other hand, the new PIM join/prune messages 914 that are sent in view of the update will only be transmitted by those network nodes for which the RPF neighbor is changed due to the update. For the example of an update from the path {R2, R3, R4, R5, R6} to the path {R2, R3, R4, R7, R6}, these are nodes R4, R5, and R7. FIG. 9 illustrates that by showing PIM prune messages 914 (indicated with dash-dotted arrows) going from R4 to R5, and from R5 to R6, and by showing PIM join messages 916 (indicated with solid arrows) going from R4 to R7, and from R7 to R6.

Figure 10:
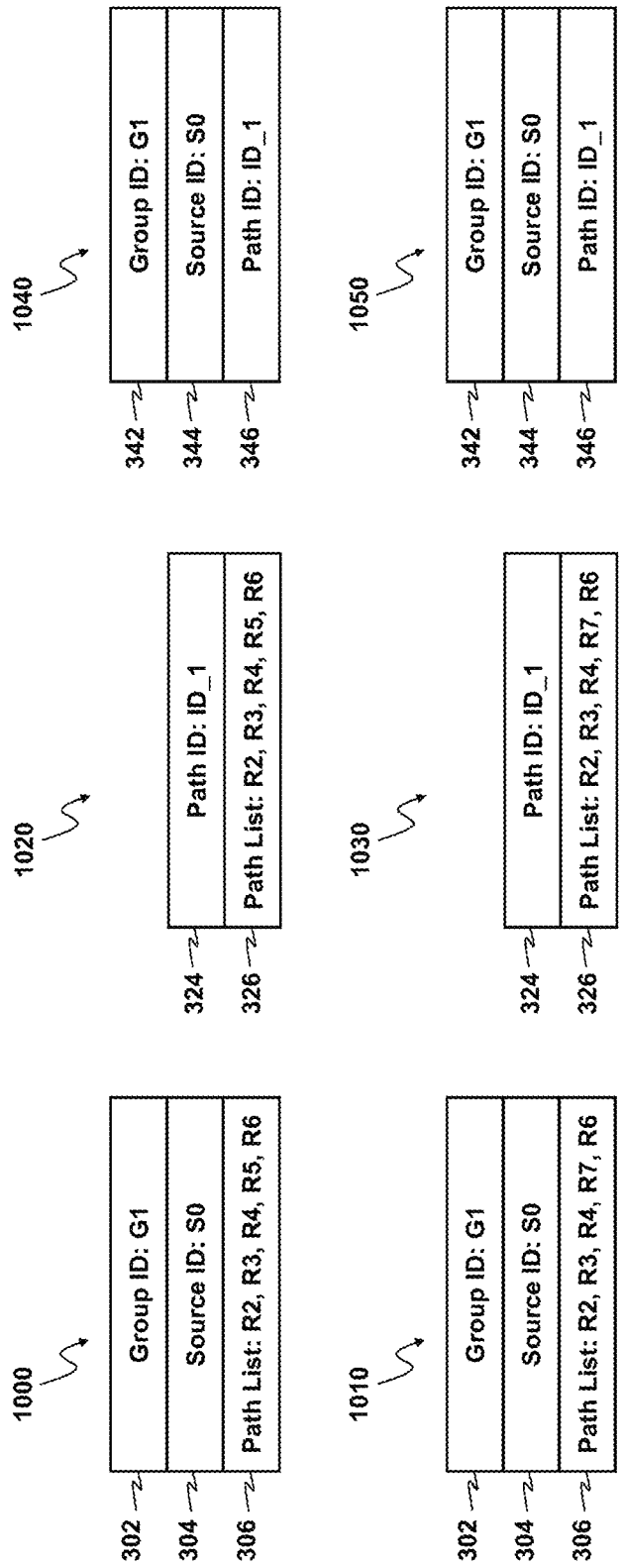
FIG. 10A illustrates an example of conventional PIM join/prune messages for announcing a path update.
FIGS. 10B and 10C illustrate, respectively, a path list message and PIM join/prune messages for announcing a path update, according to some embodiments of the present disclosure.

FIGS. 10A-10C provide examples of, respectively, conventional old and new PIM join/prune message, old and new path list messages as proposed herein, and old and new PIM join/prune messages as proposed herein for the example of FIG. 9.

FIG. 10A illustrates conventional PIM join/prune messages 1000 and 1010, each of which is an example of the PIM join/prune message 300 shown in FIG. 3A. The conventional PIM join/prune message 1000 is the old message, announcing the old path {R2, R3, R4, R5, R6}, and is the same as the conventional PIM join/prune message 400 shown in FIG. 4A and described above. Similarly, the old path message 1020 shown in FIG. 10B and the old PIM join/prune message 1040 shown in FIG. 10C are the same as respective messages shown in FIGS. 4B and 4C. In the interests of brevity, descriptions of these old messages is not repeated here.

The new PIM join/prune message 1010 which would be sent in conventional implementations would encode the updated path list in its field 306, as shown in FIG. 10A. The fields 302 and 304 of this message would remain the same as for the old PIM join/prune message 1000.

The new path list message 1030 which would be sent according to the present disclosure would encode the updated path list in its field 326, i.e. path list {R2, R3, R4, R7, R6}, as shown in FIG. 10B. The field 324 of this message would remain the same as for the old path list message 1020.

The new PIM join/prune message 1050 which would be sent according to the present disclosure would be the same as the old PIM join/prune message 1040, as shown in FIG. 10C, because the identifier does not change and the actual change in the path was communicated to the nodes via the path list message 1020. Such a new PIM join/message 1050 would only be sent by nodes which are affected by the change, as described above.

Figure 11:
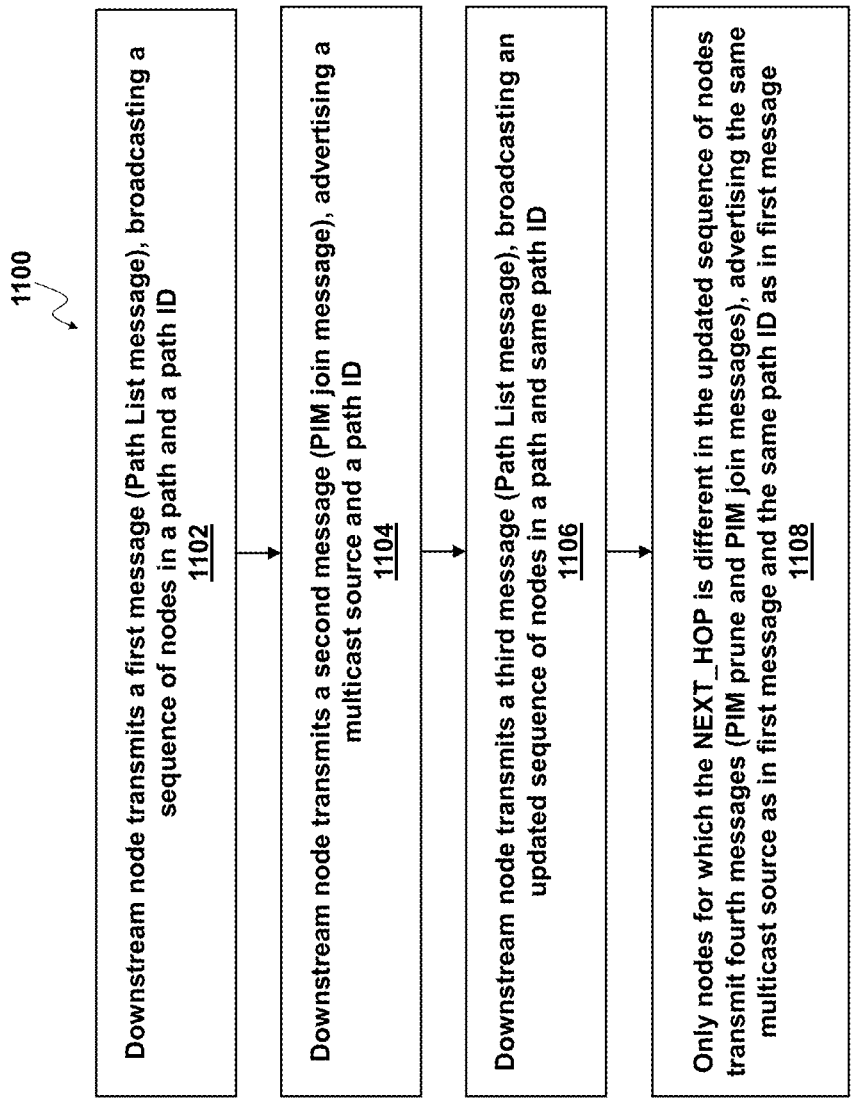
FIG. 11 is a flow diagram of a method for distributing network path information using path list messages and PIM join/prune messages, according to some embodiments of the present disclosure.

FIG. 11 is a flow diagram of a method 1100 for distributing network path information using path list messages and PIM join/prune messages, according to some embodiments of the present disclosure. Although descriptions of the method 1100 may refer to elements shown in some of the previous FIGURES, any system, configured to perform the steps of the method 1100, in any order, is within the scope of the present disclosure.

The method 1100 may begin a step 1102 where a downstream node, e.g. node R1, transmitting a first message that announces a sequence of nodes in a specified network path for a given group and source, as well as a path identifier assigned to the path. The first message may e.g. be the path list message 210, 320, 420, 620, 820, or 1020. In some embodiments, in step 1102, the first message may be flooded to all of the network nodes in the network environment 200 (where "all of the network nodes" are understood to include the nodes configured to operate according with the embodiments of the present disclosure).

In step 1104, the downstream node, e.g. node R1, transmits a second message advertising a multicast source and a path identifier assigned to the path that is the network path for the advertised source. The second message may e.g. be the PIM join/prune message 204, 340, 440, 640, 840, or 1040. The second message is transmitted to the RPF neighbor of the downstream node according to the network path identified by the second message.

In step 1106, the downstream node, e.g. node R1, transmits a third message announcing an updated sequence of nodes in an updated network path for a given group and source, with the path identifier that was assigned to the old path. The third message may e.g. be the path list message 210, 910, or 1030. In some embodiments, in step 1106, the third message may be flooded to all of the network nodes in the network environment 200.

In step 1108, only those nodes which are not the upstream nodes for the announced path and for which the RPF neighbor changed when the path changed from the old path to the updated path announced in 1106, transmit a fourth message advertising the multicast source as in 1102 and the path identifier assigned to the path in 1102, the path identifier now representing the updated network path for the advertised source. The fourth message may e.g. be the PIM join/prune message 204, 914/916, or 1050. The fourth message is transmitted to the RPF neighbor of the nodes affected by the update.

Exemplary Devices

Figure 12:
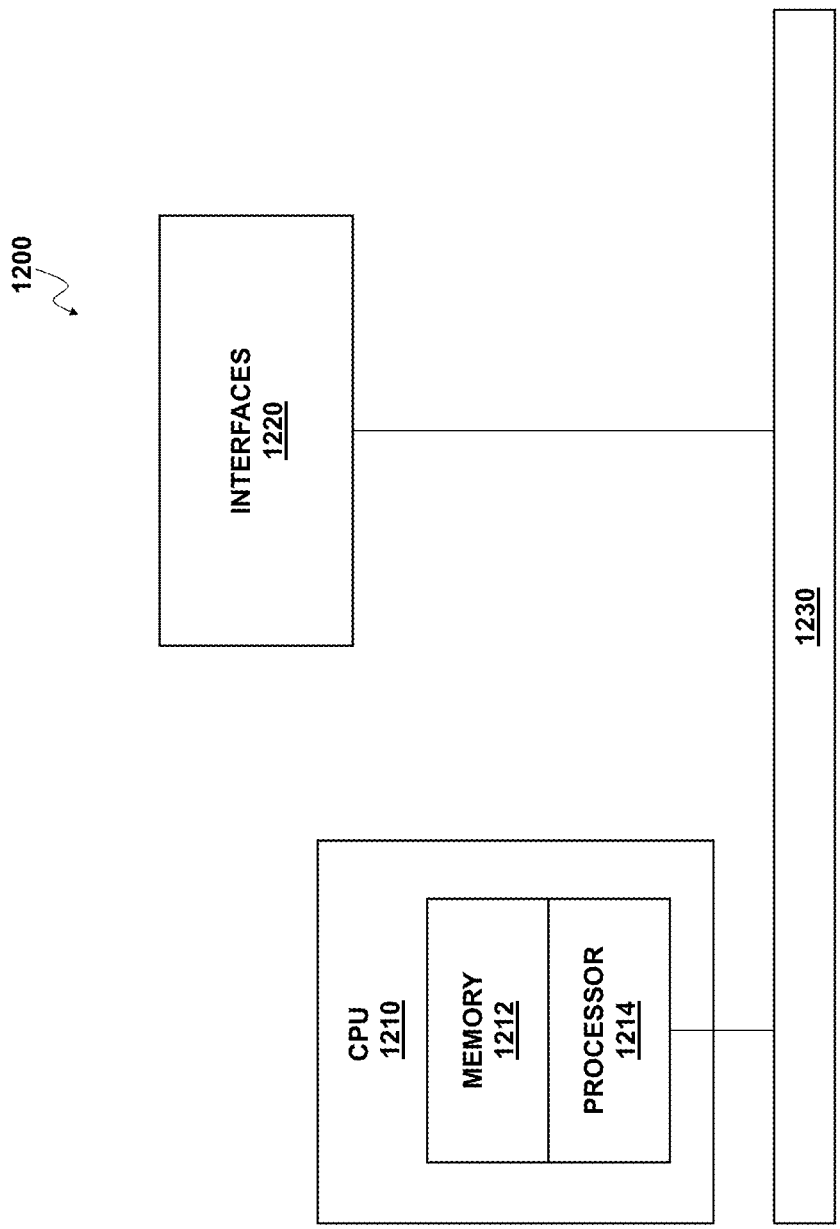
FIG. 12 illustrates an example network device suitable for implementing various embodiments of the present disclosure.

FIG. 12 illustrates an example network device 1200 suitable for implementing various embodiments of the present disclosure, e.g. embodiments related to distributing network path information. In various embodiments, the network device 1200 could be any one of network nodes described herein, e.g. the network device 1200 may be used to implement the functionality of any one of the nodes within the network environment 200, such as e.g. any one of the nodes R1-R7, R22, R33, R44, and R55, shown in FIG. 2. In some embodiments, the network device 1200 could be communicatively connected to any one of network elements described herein in order to configure any one of these elements to carry out their functionality in distributing network path information as described herein.

As shown in FIG. 12, the network device 1200 includes a master central processing unit (CPU) 1210, interfaces 1220, and a bus 1230 (e.g., a PCI bus). When acting under the control of appropriate software or firmware, the CPU 1210 may be responsible for executing processing of path list and PIM join/prune messages, packet management, error detection, and/or routing or forwarding functions. The CPU 1210 can accomplish all these functions under the control of software including an operating system and any appropriate applications software. CPU 1210 may include one or more processors 1214 such as e.g. a processor from the Motorola family of microprocessors or the MIPS family of microprocessors. In an alternative embodiment, processor 1214 is specially designed hardware for controlling the operations of network device 1200 in accordance with embodiments described herein. In a specific embodiment, a memory 1212 (such as non-volatile RAM and/or ROM) also forms part of CPU 1210. However, there are many different ways in which memory could be coupled to the system.

The interfaces 1220 are typically provided as interface cards (sometimes referred to as "line cards"). Generally, they control the sending and receiving of data packets over the network and sometimes support other peripherals used with the network device 1200. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1210 to efficiently perform routing computations, network diagnostics, security functions, etc.

Although the system shown in FIG. 12 is one specific network device of the present disclosure, it is by no means the only network device architecture on which the present disclosure can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 1212) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 13:
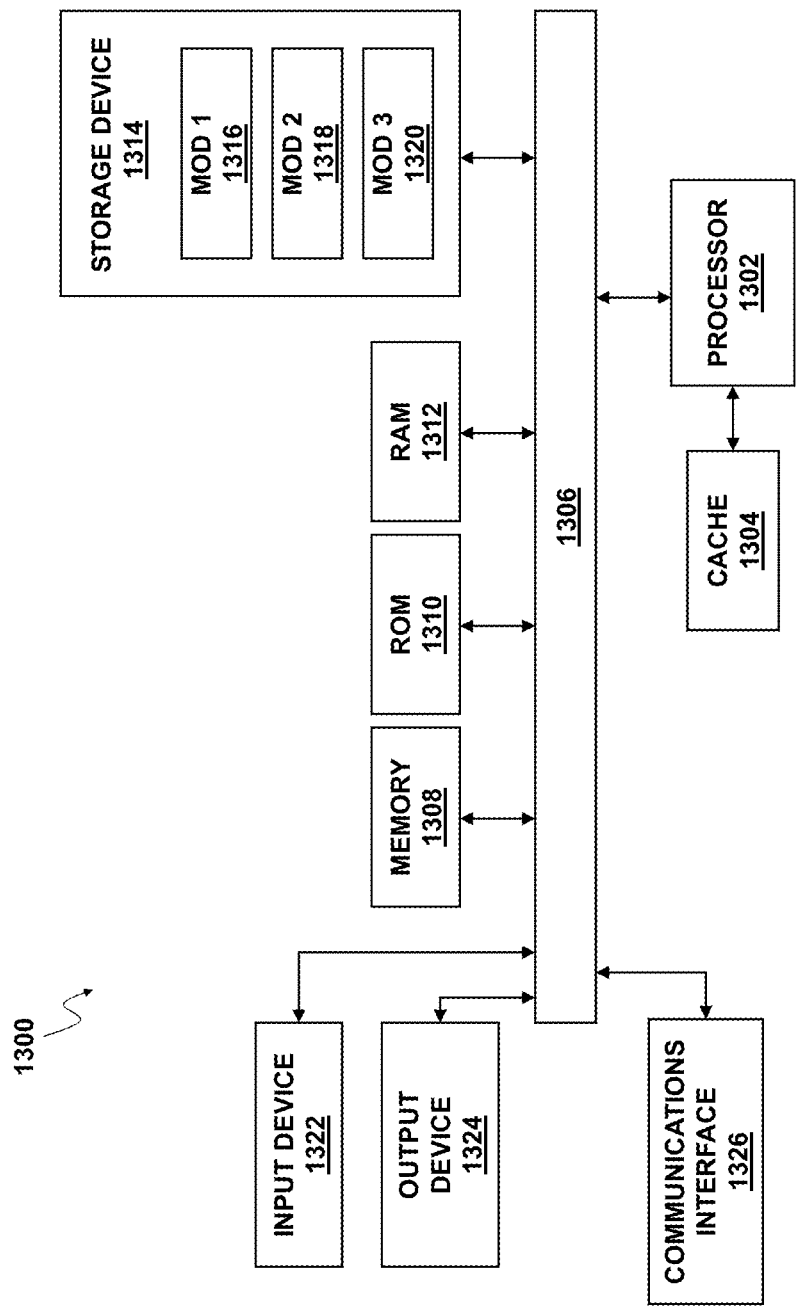
FIGS. 13 and 14 illustrate example systems suitable for implementing various embodiments of the present disclosure, according to some embodiments of the present disclosure.
Figure 14:
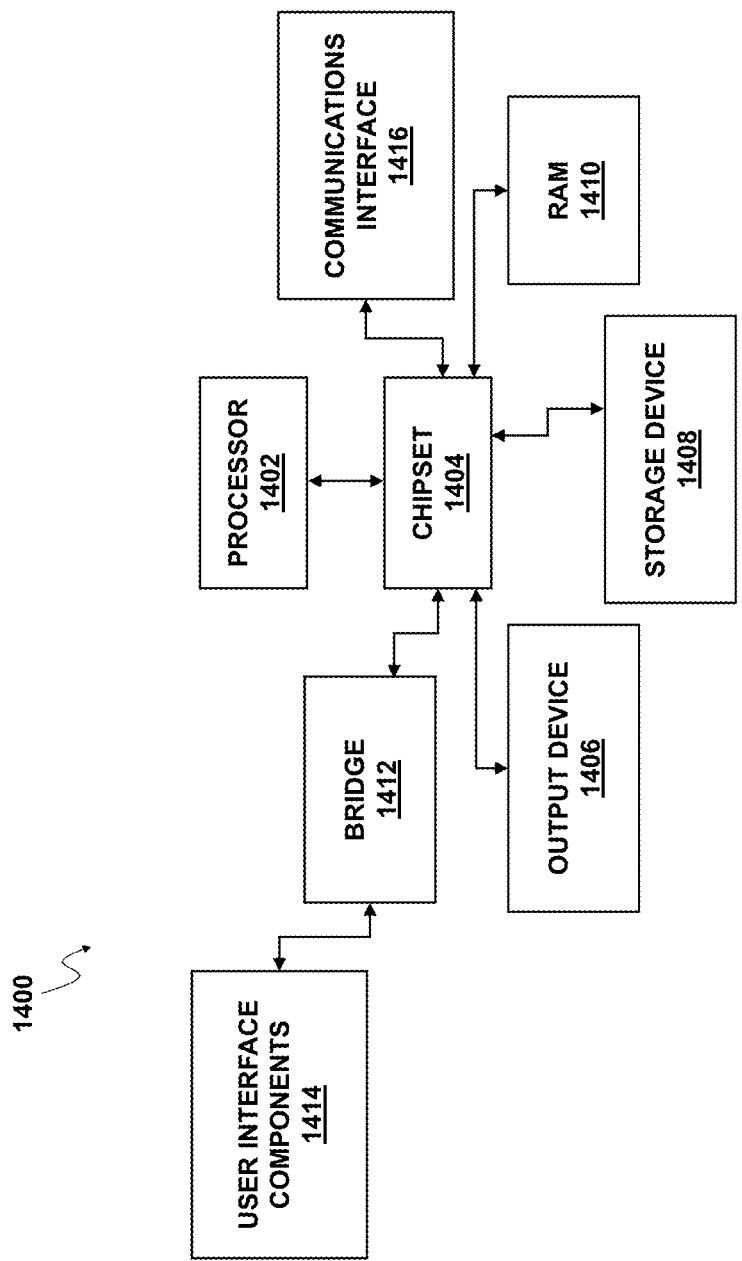

FIGS. 13 and 14 illustrate example systems, according to some embodiments of the present disclosure. The more appropriate embodiment will be apparent to those of ordinary skill in the art when practicing the present technology. Persons of ordinary skill in the art will also readily appreciate that other system embodiments are possible.

Systems such as the ones shown in FIGS. 13 and 14 are also suitable for implementing various embodiments of the present disclosure, e.g. embodiments related to distributing network path information described herein. In various embodiments, such systems could be any one of or could be communicatively connected to in order to configure any one of the network nodes described herein to enable functionality of these nodes as described above, e.g. any of the network nodes of the network environment 200 shown in FIG. 2.

FIG. 13 illustrates a conventional system bus computing system architecture 1300 wherein the components of the system are in electrical communication with each other. Exemplary system 1300 includes a processing unit (CPU or processor) 1302, communicatively connected to a system bus 1306. The system bus 1306 couples various system components to the processor 1302, the system components including e.g. a system memory 1308, a read only memory (ROM) 1310, and a random access memory (RAM) 1312. The system 1300 can include a cache 1304 of high-speed memory connected directly with, in close proximity to, or integrated as part of the processor 1302. The system 1300 can copy data from the memory 1308 and/or the storage device 1314 to the cache 1304 for quick access by the processor 1302. In this way, the cache 1304 can provide a performance boost that avoids processor 1302 delays while waiting for data. These and other modules can control or be configured to control the processor 1302 to perform various actions. Other system memory 1308 may be available for use as well. The memory 1308 can include multiple different types of memory with different performance characteristics. The processor 1302 can include any general purpose processor and a hardware module or software module, such as module 1 1316, module 2 1318, and module 3 1320 stored in the storage device 1314, configured to control the processor 1302 as well as a special-purpose processor where software instructions are incorporated into the actual processor design. The processor 1302 may essentially be a completely self-contained computing system, containing multiple cores or processors, a bus, memory controller, cache, etc. A multi-core processor may be symmetric or asymmetric.

To enable user interaction with the computing device 1300, an input device 1322 can represent any number of input mechanisms, such as a microphone for speech, a touch-sensitive screen for gesture or graphical input, keyboard, mouse, motion input, speech and so forth. An output device 1324 can also be one or more of a number of output mechanisms known to those of skill in the art. In some instances, multimodal systems can enable a user to provide multiple types of input to communicate with the computing device 1300. The communications interface 1326 can generally govern and manage the user input and system output. There is no restriction on operating on any particular hardware arrangement and therefore the basic features here may easily be substituted for improved hardware or firmware arrangements as they are developed.

Storage device 1314 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1312, read only memory (ROM) 1310, and hybrids thereof.

The storage device 1314 can include software modules 1316, 1318, 1320 for controlling the processor 1302. Other hardware or software modules are contemplated. The storage device 1314 can be connected to the system bus 1306. In one aspect, a hardware module that performs a particular function can include the software component stored in a non-transitory computer-readable medium in connection with the necessary hardware components, such as the processor 1302, bus 1306, display 1324, and so forth, to carry out the function.

FIG. 14 illustrates an example computer system 1400 having a chipset architecture that can be used in executing the described method and generating and displaying a graphical user interface (GUI). Computer system 1400 is an example of computer hardware, software, and firmware that can be used to implement the disclosed technology. System 1400 can include a processor 1402, representative of any number of physically and/or logically distinct resources capable of executing software, firmware, and hardware configured to perform identified computations. Processor 1402 can communicate with a chipset 1404 that can control input to and output from processor 1402. In this example, chipset 1404 outputs information to output 1406, such as a display, and can read and write information to storage device 1408, which can include magnetic media, and solid state media, for example. Chipset 1404 can also read data from and write data to RAM 1410. A bridge 1412 for interfacing with a variety of user interface components 1414 can be provided for interfacing with chipset 1404. Such user interface components 1414 can include a keyboard, a microphone, touch detection and processing circuitry, a pointing device, such as a mouse, and so on. In general, inputs to system 1400 can come from any of a variety of sources, machine generated and/or human generated.

Chipset 1404 can also interface with one or more communication interfaces 1416 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1402 analyzing data stored in storage 1408 or 1410. Further, the machine can receive inputs from a user via user interface components 1414 and execute appropriate functions, such as browsing functions by interpreting these inputs using processor 1402.

It can be appreciated that example systems 1300 and 1400 can have more than one processor 1302, 1402, or be part of a group or cluster of computing devices networked together to provide greater processing capability.

SELECTED EXAMPLES

Example 1 provides a method that includes generating a first message for announcing a network path indicating a route for a multicast traffic from a multicast source to a host, the network path specifying a sequence of one or more intermediate network nodes between a downstream node communicatively connected to the host and an upstream node communicatively connected to the multicast source; generating a second message for announcing that the multicast source is to be reached via said network path; and transmitting the first message and the second message. In some Examples, the first message is flooded to all of network nodes in the network node, while the second message is transmitted to a first node of said sequence, i.e. to the RPF neighbor of the downstream node according to said sequence. The first message includes a field encoding said sequence from the downstream node to the upstream node, the second message includes a field encoding an identification of the multicast source, and both the first message and the second message include a field encoding a value of an identifier for identifying said sequence from the downstream node to the upstream node.

Example 2 provides the method according to Example 1, where the identifier included in the second message is provided instead of including said sequence in the second message. In this manner, the network path which should have been advertised along with the identification of the multicast source is replaced by the identifier which is shorter in length.

Example 3 provides the method according to Examples 1 or 2, where the second message is a protocol-independent-multicast (PIM) join/prune message.

Example 4 provides the method according to any one of Examples 1-3, further including, when an updated network path replaces the network path, generating a third message for announcing the updated network path indicating an updated route for the multicast traffic from the multicast source to the host, the updated network path specifying an updated sequence of one or more intermediate network nodes between the downstream node and the upstream node, where the updated sequence is different from the original sequence in at least one network node, where the third message includes a field encoding said updated sequence from the downstream node to the upstream node and a field encoding a value of the identifier for identifying said sequence (i.e. an updated sequence of network nodes is associated with the same identifier that was used for the original sequence of nodes that was transmitted in the first message, as specified by the third message by including the updated sequence in association with original identifier that was included in the first message); and transmitting the third message e.g. by flooding the third message to the network.

Example 5 provides the method according to Example 4, where, when a first node of said updated sequence is different from a first node of said original sequence, the method further includes generating and transmitting a fourth message for announcing that the multicast source is to be reached via said updated network path, the fourth message including a field encoding the identification of the multicast source and a field encoding a value of the identifier for identifying said sequence.

Example 6 provides the method according to Example 4, where, when a first node of said updated sequence is the same as a first node of said original sequence, the method further includes suppressing generating and transmitting a fourth message for announcing that the multicast source is to be reached via said updated network path, the fourth message including a field encoding the identification of the multicast source and a field encoding a value of the identifier for identifying said sequence. In other words, the downstream node re-originates a PIM join/prune message by generating and transmitting the fourth message as described herein only when the first node in the sequence of nodes (i.e. the RPF neighbor node for the path from the downstream node to the upstream node) changes.

Example 7 provides the method according to Examples 5 or 6, where the fourth message is a protocol-independent-multicast (PIM) join/prune message.

Example 8 provides the method according to any one of the preceding Examples, where said multicast source is a first multicast source, said network path is a first network path, said sequence is a first sequence, and said identifier is a first identifier, the first message further includes a field encoding a second sequence of one or more intermediate network nodes between the downstream node communicatively connected to the host and an upstream node communicatively connected to a second multicast source and a second identifier identifying the second sequence, and the method further includes generating and transmitting an additional message for announcing that the second multicast source is to be reached via said second network path, the additional message including a field encoding an identification of the second multicast source and the second identifier identifying the second sequence.

Example 9 provides a method that includes receiving, at an intermediate node, a first message including a field encoding a network path indicative of a route for a multicast traffic from a multicast source to a host, the network path including a sequence of one or more intermediate network nodes between a downstream node communicatively connected to the host and an upstream node communicatively connected to the multicast source, and an identifier identifying said sequence from the downstream node to the upstream node; receiving, at the intermediate node, a second message announcing that the multicast source is to be reached via said network path, the second message including a field encoding an identification of the multicast source, and said identifier identifying said sequence from the downstream node to the upstream node; and transmitting, by the intermediate node, to its RPF neighbor, a third message including a field encoding said identification of the multicast source and said identifier.

Example 10 provides the method according to Example 9, where each of the second message and the third message is a protocol-independent-multicast (PIM) join/prune message.

Example 11 provides the method according to Examples 9 or 10, further including the intermediate node transmitting a fourth message including a field encoding the network path specified in the first message and the identifier specified in the first message. Thus, the intermediate node re-originates the path list message. All intermediate nodes doing the same allows path list messages to flood the network (i.e. be propagated to all network nodes of the network).

Example 12 provides the method according to Examples 10 or 11, further including receiving, at the intermediate node, a fourth message including a field encoding an updated network path indicative of an updated route for the multicast traffic from the multicast source to the host, the updated network path including an updated sequence of one or more intermediate network nodes between the downstream node and the upstream node, and a field encoding the value of the identifier for identifying said sequence (i.e. an updated sequence of network nodes is associated with the same identifier that was used for the original sequence of nodes that was transmitted in the first message, as specified by the fourth message by including the updated sequence in association with original identifier that was included in the first message); and, when a first node following the intermediate node in said updated sequence is different from the first node following the intermediate node in said original sequence, then transmitting, by the intermediate node, a fifth message including a field encoding said identification of the multicast source and said identifier to the first node following the intermediate node in said updated sequence.

Example 13 provides the method according to Example 12, further including preventing transmission of the fifth message when the first node following the intermediate node in said updated sequence is not different from (i.e. is the same as) the first node following the intermediate node in said original sequence.

Example 14 provides a method that includes transmitting a first message, the first message including a sequence of one or more network nodes representing a network path for multicast traffic between an egress node communicatively connected to a receiver device and an ingress node communicatively connected to a multicast source device, and an identifier associated with the sequence, and transmitting a second message, the second message including an identification of the multicast source and the identifier associated with the sequence.

Example 15 provides the method according to Example 14, further including, when an updated network path replaces the network path, transmitting a third message, the third message including an updated sequence of one or more network nodes representing an updated network path replacing the network path, and the identifier associated with the sequence of the network path being replaced (i.e. an updated sequence of network nodes is associated with the same identifier that was used for the original sequence of nodes that was transmitted in the first message, as specified by the third message by including the updated sequence in association with original identifier that was included in the first message).

Example 16 provides the method according to Examples 14 or 15, further including, when a first node of said updated sequence is different from a first node of said original sequence, transmitting a fourth message to the first node of said updated sequence, the fourth message including a field encoding the identification of the multicast source and a field encoding a value of the identifier associated with the sequence.

Example 17 provides the method according to Example 16, where the fourth message is a protocol-independent-multicast (PIM) join/prune message.

Example 18 provides the method according to any one of Examples 14-17, where the second message is a protocol-independent-multicast (PIM) join/prune message.

Example 19 provides the method according to any one of Examples 14-18, where the first message is transmitted to a plurality of nodes in a network.

Example 20 provides the method according to any one of Examples 14-16, where the second message is transmitted to a first node of the sequence.

Further Examples include a system for distributing network path information for multicast traffic, the system including at least one memory element configured to store computer executable instructions and at least one processor coupled to the at least one memory element and configured, when executing the instructions, to carry out methods according to any one of the preceding Examples.

Further Examples include one or more non-transitory computer readable storage media encoded with software comprising computer executable instructions and, when the software is executed, operable to carry out methods according to any one of the preceding Examples.

Further Examples include data structures to be used in methods according to any one of the preceding Examples.

VARIATIONS AND IMPLEMENTATIONS

It should be noted that much of the infrastructure discussed herein can be provisioned as a part of any type of a network node.

In one implementation, network nodes described herein can include software to achieve (or to foster) the network path distribution activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to a myriad of other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   transmitting a first message, the first message specifying a network path indicating a route for multicast traffic to be passed from a multicast source to a host, wherein the first message specifies the network path by listing a sequence of one or more network nodes between a downstream node connected to the host and an upstream node connected to the multicast source; and
   transmitting a second message subscribing the host to the multicast traffic from the multicast source via said network path, wherein the second message includes an identification of the multicast source and an identifier for identifying the network path without listing the sequence of the one or more network nodes;
   receiving a packet of the multicast traffic from the multicast source;
   forwarding the packet of the multicast traffic to the host along the sequence of one or more network nodes listed in the first message that are identified by the identifier in the second message;
   responsive to a determination that an updated network path replaces the network path, transmitting a third message for announcing the updated network path indicating an updated route for the multicast traffic from the multicast source to the host, the updated network path specifying an updated sequence of one or more network nodes between the downstream node and the upstream node, wherein the third message includes said updated sequence and the identifier for identifying the network path; and
   responsive to a determination that a first node of said updated sequence is the same as a first node of said sequence, suppressing transmitting a fourth message for announcing that the multicast source is to be reached via said updated network path.

2. The method according to claim 1, wherein the second message is a protocol-independent-multicast (PIM) join/prune message.

3. The method according to claim 1, wherein, when the first node of said updated sequence is different from the first node of said sequence, the method further comprises generating and transmitting the fourth message for announcing that the multicast source is to be reached via said updated network path, the fourth message including the identification of the multicast source and the identifier for identifying the network path.

4. The method according to claim 3, wherein the fourth message is a protocol-independent-multicast (PIM) join/prune message.

5. The method according to claim 1, wherein:
said multicast source is a first multicast source, said network path is a first network path, said sequence is a first sequence, and said identifier is a first identifier,
the first message further specifies a second network path by listing a second sequence of one or more network nodes between the downstream node and a second upstream node and a second identifier identifying the second sequence, and
the method further includes generating and transmitting an additional message for announcing that a second multicast source is to be reached via said second network path, the additional message including an identification of the second multicast source and the second identifier identifying the second sequence.

6. The method according to claim 1, wherein the first message is transmitted to a plurality of nodes in a network.

7. A method comprising:
receiving, at an intermediate network node between a downstream node connected to a host and an upstream node connected to a multicast source, a first message specifying a network path indicative of a route for multicast traffic to be passed from the multicast source to the host, the network path comprising a sequence of one or more network nodes between a downstream node and an upstream node, wherein the first message includes an identifier identifying said sequence;
receiving, at the intermediate network node, a second message announcing that the multicast source is to be reached via said network path, the second message comprising an identification of the multicast source, and said identifier identifying said sequence;
transmitting, by the intermediate network node, a third message comprising said identification of the multicast source and said identifier;
receiving a packet of the multicast traffic at the intermediate network node;
forwarding the packet of the multicast traffic from the intermediate network node to a first node following the intermediate network node in said sequence;
receiving, at the intermediate network node, a fourth message specifying an updated network path indicative of an updated route for the multicast traffic from the multicast source to the host, the updated network path comprising an updated sequence of one or more network nodes between the downstream node and the upstream node, and said identifier; and
responsive to a determination that a first node following the intermediate network node in said updated sequence is the same as the first node following the intermediate network node in said sequence, preventing transmission of a fifth message comprising said identification of the multicast source and said identifier.

8. The method according to claim 7, wherein each of the second message and the third message is a protocol-independent-multicast (PIM) join/prune message.

9. The method according to claim 7, further comprising the intermediate network node forwarding the first message specifying the network path and the identifier identifying said sequence of one or more network nodes.

10. The method according to claim 7, further comprising:
when the first node following the intermediate network node in said updated sequence is different from the first node following the intermediate network node in said sequence, then transmitting, by the intermediate network node, the fifth message comprising said identification of the multicast source and said identifier to the first node following the intermediate network node in said updated sequence.

11. The method according to claim 10, wherein the fifth message is a protocol-independent-multicast (PIM) join/prune message.

12. A system for distributing network path information for multicast traffic, the system comprising:
at least one memory element configured to store computer executable instructions, and
at least one processor coupled to the at least one memory element and configured, when executing the instructions, to:
transmit a first message, the first message specifying a sequence of one or more network nodes representing a network path for multicast traffic between an egress node communicatively connected to a receiver device and an ingress node communicatively connected to a multicast source device, and an identifier associated with the sequence,
transmit a second message subscribing to the multicast traffic, the second message comprising an identification of the multicast source device and the identifier associated with the sequence without listing the sequence;
receive a packet of the multicast traffic;
forward the packet of the multicast traffic to the receiver device along the sequence of one or more network nodes specified in the first message that are associated with the identifier in the second message;
responsive to a determination that an updated network path replaces the network path, transmitting a third message comprising an updated sequence of one or more network nodes representing the updated network path replacing the network path, wherein the third message includes said updated sequence and the identifier associated with the network path being replaced; and
responsive to a determination that a first node of said updated sequence is different from a first node of said sequence, transmitting a fourth message pruning the network path from the first node of said sequence.

13. The system according to claim 12, wherein, the at least one processor is further configured to:
when the first node of said updated sequence is different from the first node of said sequence, transmit a fifth message to the first node of said updated sequence, the fifth message comprising the identification of the multicast source device and the identifier associated with the sequence.

14. The system according to claim 13, wherein the fifth message is a protocol-independent-multicast (PIM) join/prune message.

15. The system according to claim 12, wherein the second message is a protocol-independent-multicast (PIM) join/prune message.

16. The system according to claim 12, wherein the first message is transmitted to a plurality of nodes in a network.

17. The system according to claim 12, wherein the second message is transmitted to the first node of the sequence.

* * * * *